US012612886B2

(12) United States Patent
Abou Nehmi Filho et al.

(10) Patent No.: US 12,612,886 B2
(45) Date of Patent: Apr. 28, 2026

(54) HYDROGEN GENERATION DEVICE FOR OPTIMISING COMBUSTION AND REDUCING THE EMISSION OF POLLUTANTS IN DIESEL CYCLE ENGINES AND METHOD OF USE

(71) Applicants: Victor Abou Nehmi Filho, São Paulo (BR); Pedro Estevão Cornélio Carlos Veras, São Paulo (BR); Paulo Sergio Pereira da Silva, Santo André (BR); Decio del Debbio, São Bernardo do Campo (BR); Cauê Alves Martins, Campo Grande (BR)

(72) Inventors: Victor Abou Nehmi Filho, São Paulo (BR); Pedro Estevão Cornélio Carlos Veras, São Paulo (BR); Paulo Sergio Pereira da Silva, Santo André (BR); Decio del Debbio, São Bernardo do Campo (BR); Cauê Alves Martins, Campo Grande (BR)

( * ) Notice: Subject to any disclaimer, the term of this patent is extended or adjusted under 35 U.S.C. 154(b) by 0 days.

(21) Appl. No.: 18/845,160

(22) PCT Filed: Mar. 8, 2023

(86) PCT No.: PCT/BR2023/050078

§ 371 (c)(1),
(2) Date: Sep. 9, 2024

(87) PCT Pub. No.: WO2023/168505

PCT Pub. Date: Sep. 14, 2023

(65) Prior Publication Data

US 2025/0179977 A1 Jun. 5, 2025

(30) Foreign Application Priority Data

Mar. 8, 2022 (BR) ......................... 102022004276-4

(51) Int. Cl.

| | |
|---|---|
| ***F02M 21/06*** | (2006.01) |
| ***C25B 1/04*** | (2021.01) |
| ***C25B 9/67*** | (2021.01) |
| ***C25B 11/046*** | (2021.01) |
| ***C25B 15/02*** | (2021.01) |
| ***F02M 21/02*** | (2006.01) |

(52) U.S. Cl.

CPC ............... *F02M 21/06* (2013.01); *C25B 1/04* (2013.01); *C25B 9/67* (2021.01); *C25B 11/046* (2021.01);

(Continued)

(58) Field of Classification Search

CPC .. F02M 21/06; F02M 21/0206; C25B 11/046; C25B 9/67; C25B 1/04; C25B 15/02

See application file for complete search history.

(56) References Cited

U.S. PATENT DOCUMENTS 7,430,991 B2 10/2008 VanHoose et al.
8,955,469 B2 2/2015 McConahay et al.

(Continued)

FOREIGN PATENT DOCUMENTS

BR 102015007007 A2 1/2017
CA 2945891 A 4/2018

(Continued)

*Primary Examiner* — Syed O Hasan
(74) *Attorney, Agent, or Firm* — The Webb Law Firm

(57) ABSTRACT

This invention is about a hydrogen-generating device, with low energy consumption and high electrode durability, for diesel cycle engines. The hydrogen generating device includes an electrolysis cell made of aluminum, containing heat exchanger fins on the outside, an electrolytic solution, two electrodes; a hydrogen transport system to be injected into the engine's air intake system; electronic module for direct voltage control, used in electrolysis, of the electrode polarity alternation time, of the volume of hydrogen in a mixture of constant hydrogen/oxygen composition to be injected into the engine in a variable manner, thus injecting a quantity of up to 10% of the hydrogen:oxygen mixture, in (Continued)

the ratio of 65:35, per liter of diesel consumed, in a volume/volume ratio.

11 Claims, 25 Drawing Sheets

(52) U.S. Cl.
CPC ......... *C25B 15/02* (2013.01); *F02M 21/0206* (2013.01)

(56) References Cited

U.S. PATENT DOCUMENTS

| | | | | |
|---|---|---|---|---|
| 9,051,872 | B2 * | 6/2015 | Monros | C25B 15/02 |
| 10,253,685 | B2 | 4/2019 | Alexander et al. | |
| 10,619,562 | B2 | 4/2020 | Johnson et al. | |
| 2005/0217991 | A1 | 10/2005 | Dahlquist | |
| 2011/0114506 | A1 * | 5/2011 | Fletcher | C25F 3/02 205/640 |
| 2013/0061822 | A1 | 3/2013 | Adair | |
| 2017/0110883 | A1 * | 4/2017 | Tabe | F03B 13/26 |
| 2017/0254259 | A1 | 9/2017 | Johnson et al. | |
| 2018/0058287 | A1 | 3/2018 | Zhang | |
| 2020/0158031 | A1 * | 5/2020 | Monros | F02D 41/064 |
| 2024/0018670 | A1 * | 1/2024 | Spiros | H01M 8/0656 |

FOREIGN PATENT DOCUMENTS

| | | | |
|---|---|---|---|
| CN | 103789785 | A | 5/2014 |
| WO | 2011127583 | A1 | 10/2011 |
| WO | 2014029015 | A1 | 2/2014 |

* cited by examiner

| | | |
|---|---|---|
| Vehicle model | Iveco Stralis Hi Way 600S44T (6x2) | |
| Identification |  Test | 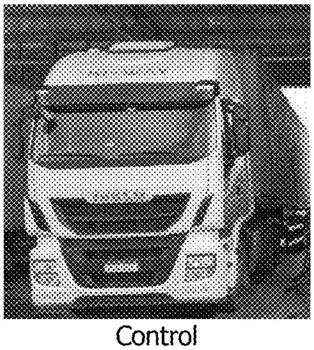 Control |
| Chassis | 93ZM2SSH0N8837657 | 93ZM2SSH0N8836987 |
| Initial test km | 52,597.0 km | 52,925.0 km |
| Final test km | 54,786.0 km | 54,430.6 km |
| Year | 2022 | 2022 |
| License Plate | RLN2B99 | RLN2B59 |
| Engine | FPT Cursor 13 440 CV@1500-1900 rpm 2250 Nm | |
| Shifting box | ZF 16AS 2630 TO | |
| Rear axle | Meritor MS23-18X reduction 3.40:1 | |
| Tires | 295/80 R22.5 | |
| Wheels | Steel 8.25″x22.5″ | |
| Brakes | Drum – ABS with EBL (EBD) | |
| PBTC (kg) | 53.000 | |
| Informed PBTC (kg) | 42,460 | 43,240 |
| Semi-Trailer - Brand | Lençóis | Rodofort |
| Semi-trailer - Model | SR/LEÇOIS SR PC | Container Trailer 03E |
| Ballast | 2,700 ft³ container - loaded | 2,700 ft³ container – loaded |

Table 6

Figure 29

HYDROGEN GENERATION DEVICE FOR OPTIMISING COMBUSTION AND REDUCING THE EMISSION OF POLLUTANTS IN DIESEL CYCLE ENGINES AND METHOD OF USE

CROSS-REFERENCE TO RELATED APPLICATIONS

This application is the United States national phase of International Patent Application No. PCT/BR2023/050078 filed Mar. 8, 2023, and claims priority to Brazilian patent application Ser. No. 10/202,2004276-4 filed Mar. 8, 2022, the disclosures of which are hereby incorporated by reference in their entireties.

BACKGROUND OF THE INVENTION

Field of the Invention

The present invention relates to a hydrogen generator device that produces a pre-determined hydrogen/oxygen mixture, with a controlled flow that automatically adjusts according to immediate demand, featuring low energy consumption and high electrode durability, intended to be used as a combustion optimizer and pollutant emission reducer in diesel cycle engines.

Description of Related Art

Due to its high calorific value and the fact that the result of its combustion generates only water vapor, hydrogen has been the subject of attempts to use it as fuel in internal combustion engines for many decades.

Hydrogen has the potential to be used alone as a fuel, or to partially replace other fuels. The partial or total replacement of hydrocarbons, such as gasoline, diesel, ethanol and methane or petroleum gas by hydrogen, aims to increase the efficiency of the combustion reaction and reduce the products and intermediates of the incomplete reaction, with a positive environmental impact and a reduction in total fuel consumption.

However, due to the significant challenges in materials engineering, it was decided to use in situ hydrogen generator devices installed alongside the engines, which convert an electrolyte solution into hydrogen for immediate use.

The main limitation to the use of these hydrogen-generating devices has been their high energy consumption, which can make it unsustainable, technically and economically, when compared to the energy supply capacity of internal combustion engines. The generation of significant quantities of hydrogen, which can be used as a partial substitute for fuel in internal combustion engines, requires the use of a quantity of energy that, in the long term, cannot be sustained by the alternator/battery combination of commercial engines. When hydrogen-generating devices are installed for partial fuel replacement, therefore, the useful life of the batteries is usually reduced to little more than the autonomy provided by a few fuel tanks.

Another limiting factor for the adoption of hydrogen-generating devices in internal combustion engines is the useful life of the electrodes. Water electrolysis induces corrosive processes in the anode, resulting in rapid wear of the electrodes, which requires frequent maintenance. This implies a loss of time and increased costs.

The mixture of hydrogen with fuels can have two important roles in combustion. The first and most obvious role is to serve as fuel. The second, less obvious and less well-known, is to add a proportion of reducing hydrogen atoms (from the $H_2$ molecule) to the fuel mixture. The hydrogen/fuel mixture in the correct quantities optimizes combustion, making it more complete and allowing the engine to convert a greater proportion of the heat energy into a driving force. The more complete combustion reaction reduces fuel consumption per unit of driving work performed by the engine, with less formation of intermediate and partially oxidized compounds, which reduces pollutant emissions.

In order to fulfill only its second role, of adding a certain amount of reducing hydrogen to the fuel mixture, the amount of hydrogen required is much smaller than that required for its use as fuel. In this context, the adequate amount of hydrogen gas admitted together with the fuel already plays the important role of optimizing the combustion reaction, with direct implications for the efficiency of the reaction and the emission of pollutants.

In gas form, hydrogen ($H_2$) is in its reduced form and not in its oxidized form (as in water, $H_2O$), in a way that this gas participates in the combustion reaction. In hydrocarbons, carbon is in its reduced form (carbons bonded to hydrogen), so it is the carbon that participates in the combustion reaction. Only in its reduced form is the reaction of carbon or hydrogen with oxygen exothermic. In other words, the hydrogen in hydrocarbons does not contribute to the explosion and the formation of heat in internal combustion engines. However, the combustion temperature and the burning rate of hydrogen are higher than those of hydrocarbons, 2 and 9 times higher than that of diesel, respectively, so that, theoretically, the addition of hydrogen in its reduced form has the potential to improve the combustion efficiency of hydrocarbons in internal combustion engines.

Hydrogen is highly flammable in a wide range of mixtures with oxygen. This is because it requires low ignition energy, so that the mere contact with hot parts of the cylinder, with temperatures above 60° C., can generate its ignition. Despite the low ignition temperature, its combustion temperature is high, which promotes a higher compression ratio, which is directly related to the engine's greater energy efficiency. High flammability would be a defect of hydrogen, as it can trigger the combustion of the mixture prematurely, i.e., before the combustion chamber closes. Potentially damaging the operation and durability of the valve system. On the other hand, the higher combustion temperature generates a higher compression ratio, which is one of the advantages of adding hydrogen to the fuel mixture.

Hydrogen has greater diffusivity during combustion when compared to hydrocarbons. Thus, the mixture of hydrogen and hydrocarbons has the potential to homogenize the fuel-air mixture and standardize the concentration distribution of the fuel mixture in the combustion chamber.

The greater emission of soot and pollutant gases in diesel engines is a result of the incomplete combustion of the fuel, which produces intermediates and partially oxidized products. The heterogeneity of the fuel concentration distribution in the combustion chamber creates denser and less dense zones, compromising the homogeneity of consumption of the fuel mixture, which induces incomplete combustion. For this reason, the addition of hydrogen helps to homogenize the fuel mixture, with the potential to make combustion more complete, by increasing the efficiency in converting thermal energy into driving force and reducing the emission of soot and pollutant gases.

In addition to inescapable thermodynamic conditions, such as operation between different temperatures as a derivative of the Carnot cycle, most internal combustion engines have a low-efficiency rate of conversion of thermal energy into driving energy due to incomplete combustion, limiting efficiency to values below 43%. This results in the fact that they emit polluting combustion residues. Both solid residues, such as soot, and gaseous residues, such as $NO_x$, CO, $SO_2$, etc.

The main reason for incomplete combustion is the unevenness of the mixture of fuels with oxygen in the air and the uneven distribution of the fuel mixture throughout the combustion chamber. As a result, combustion occurs in different zones within the combustion chamber, generating different residues in each phase of the process. This happens because the oxidizing oxygen present in the air in the mixture is consumed unevenly. In fact, instead of one single uniform combustion that consumes the entire mixture injected into the combustion chamber, several different combustions occur, with different temperatures, oxygen consumption and efficiencies. This generates an average incomplete combustion and, consequently, the emission of a series of substances resulting from incomplete combustion. Instead of just water and carbon dioxide, which would be the theoretical emissions of complete combustion.

The widespread use of turbo compressors in internal combustion engines, which enrich the fuel mixture with oxygen, has further increased the need to increase the proportion of hydrogen in the combustion reaction, since atmospheric air contains practically no hydrogen and the mixture becomes even richer in oxygen. In this case, the hydrogen gas would have the role of increasing the homogeneity of the mixture, due to the high speed of its flame and its higher combustion temperature. In practice, its combustion will homogenize the fuel mixture and uniformize its distribution in the combustion chamber, in order to make combustion more complete.

Each new generation of engines seeks to make the mechanics of the mixture of hydrocarbon fuel with air more homogeneous and to make its dispersion in the combustion chamber more uniform. In this context, the potential for improving combustion provided by a certain amount of hydrogen in a Euro II diesel engine is greater than in a Euro III engine, for the same engine fuel consumption; and so forth.

Many studies have been conducted to evaluate the use of hydrogen as a partial substitute, or even an additive, for hydrocarbons and alcohols used as fuels, such as diesel, gasoline, ethanol and petroleum gas. All of these studies used concentrations of 3 to 30% hydrogen in the fuel mixture. Apparently, tests with less than 3% concentration were not performed because they assumed that its effect would be insignificant. They also did not use more than 30%, probably because they assumed that such a concentration would be technically and economically unfeasible, due to the high energy demand for hydrogen generation, the high temperature to which the engine would be subjected and the need to store large quantities of the gas.

The vast majority of these studies showed inconclusive or unstable results, technically and economically, casting doubt on the viability of adding hydrogen to fuel hydrocarbons. This is because there is no linearity of results as the hydrogen concentration in the mixture varies. In other words, the results of the studies do not show a clear relationship between engine efficiency and the increase in hydrogen concentration in the mixture. This may happen due to other important variables, such as oxygen concentration, combustion chamber architecture and homogeneity of the injected mixture, which begin to act as limiters of combustion efficiency. Part of this inconsistency in practical results is due to factors such as track topography, air temperature and humidity and engine vibration.

The amount of hydrogen to be injected into the fuel mixture can be measured in milliliters/minute per liter/hour of fuel. This can be a complex task since it is a gas that is produced and injected simultaneously with the intake air. On the other hand, there is a direct correlation between the amount of hydrogen produced and the energy required for its production. Thus, an alternative and more practical way of measuring the amount of hydrogen produced and injected into the intake air would be through the energy consumed by the generating device used. Since the hydrogen production capacity, as well as the energy, of each device is proportional to the engine's fuel consumption, the measurement of the hydrogen injection rate into the mixture can also be defined in energy (W)/fuel consumption (l/h).

The inventors are aware of U.S. Pat. No. 10,253,685 B2 APR/09/2019, which is related to the use of hydrogen for combustion engines.

The inventors are aware of US patent 2017/0254259 A1 SEP/07/2017, which relates to the use of hydrogen for combustion engines.

The inventors are aware of the patents and applications U.S. Pat. No. 7,430,991, US 2018/058287, CA 2945891, and US 2005/217991, which relate to the use of hydrogen for combustion engines.

The prior art includes many inventions that differ from the present invention in the following aspects:

1—the vast majority of inventions are for gasoline engines, with the present invention being for diesel engines. In other words, the present invention needs to be complemented for gasoline engines.

2-in the form in which they were presented, the vast majority of them are technically and economically unfeasible, which may justify the lack of a commercial product originating from them—at least as far as these inventors are aware.

3—the vast majority use electrodes in the form of plates, which is a different design from the present invention, which uses electrodes in the form of rods. Rod-shaped electrodes simplify maintenance, being limited to just an easy cleaning procedure, eliminating the need for chemical cleaning and decoupling of the electrodes from the support material, such as the head in this case.

4-in some cases, cathodes and anodes made of different materials are used, making polarity inversion impossible and theoretically requiring a membrane or diaphragm to separate the compartments.

5-those documents that present the possibility of polarity inversion for cathode and anode of the same composition, do so only for the moment in which the vehicle is turned on, and not in a pre-established and periodic manner, aiming to increase the stability of the electrodes.

6-most of them use an undefined composition of the gas mixture, limiting themselves to assuming the theoretical composition of 2:1 ($H_2$:$O_2$) in thermodynamic calculations, while the device according to the present invention promotes the electrolysis of water to form $H_2$:$O_2$ in pre-established proportions, preferably in 65:35 ($H_2$:$O_2$) in a constant manner, with control of the flow variation. This rationalization allows access to the theoretical values of demand for the engine in an accurate manner.

7-most documents present complex sensing systems without detailing the influence of the variable on gas production. The present invention has an electronic sensing system of topography and rotation, which automatically responds with an increase or decrease in the flow of the gas mixture according to the demand.

Document US2013061822 reports an engine enhancement system and method that uses hydrogen as a combustion catalyst within an internal combustion engine, the hydrogen being preferably obtained and/or replenished from a supply of HHO gas feeding the engine's combustion chambers, and being located in interstitial locations in the walls of the combustion chambers. The document does not specify the composition of the hydrogen/oxygen mixture, limiting itself to the theoretical composition of 2:1 ($H_2$:$O_2$). The document also does not specify the types of electrodes used. The document also does not specify in detail which variables are sensitive to the action of the controller that regulates the potential difference applied to the electrolyzer. The document indicates the option of installing a controller capable of alternating the polarity of the electrodes, and in addition to not being mandatory, the exchange would only occur each time the vehicle is started.

Document U.S. Pat. No. 10,253,685 reports a method for reducing pollutant gases and saving fuel by admitting a hydrogen/oxygen mixture. The document relates to a manual, partially automatic or automatic monitoring and adjustment system for the admission of the gas mixture. The document does not describe the electrolyzer in detail, nor its components. Additionally, this document does not explore in detail the response of the variation in flow and composition of the gas mixture to operational variables.

Document CN 103789785 teaches a water electrolysis device for producing a hydrogen/oxygen mixture for an internal combustion engine, characterized by: an electrolytic cell, a general opening switch and a control detection component. The cell is composed of a graphite cathode and a titanium alloy anode separated by a separating device. The electrolyzer is very well described and makes it clear that it is a device with two independent compartments, a cathode containing the catholyte and an anode containing the anolyte, solutions that should preferably have the same pH, depending on the type of ion-permeable separator used, if any. The use of titanium alloy as the anode increases the stability of the catalyst in aqueous solution, as predicted in Pourbaix diagrams. However, the use of electrodes with different compositions prevents polarity exchange and makes it imperative to use a separator, which can increase the maintenance cost of the device, in addition to imposing additional polarizations due to ohmic drop.

SUMMARY OF THE INVENTION

The present invention was developed to solve problems in the prior art in order to make it technically and economically viable:

1—the invention presents a long useful life for the electrodes. The prior art indicates electrodes that only last a few dozen hours, because there is oxidation of the anode and cathodic corrosion in the cathode, in addition to the deposition of mineral oxides, contained in the solution, on the electrodes, rendering them useless and requiring constant replacement of the device's electrodes. The present invention solves this problem by continuously and periodically alternating the polarity of the electrodes (thousands of times a day), in order to avoid the deposition of metal oxides on the electrodes and also reducing the oxides formed on the electrode that worked as the anode in the previous cycle. This control is performed by the electronic module that controls the device. In doing so, we can use cylindrical electrodes based on stainless steel, in different alloys, and still maintain stability for 300 technical hours of uninterrupted work.

2—the increase in temperature is an inescapable thermodynamic condition for moderate gas production via water electrolysis (tens of mL/min of flow), which requires an additional cooling system to prevent the boiling of the electrolytic solution or the use of sensors and logic to interrupt gas production at certain temperatures. The present invention overcomes this limitation with the strategic installation of heat exchanger fins on the outside of the cell and with dimensions that homogenize the temperature distribution inside it.

3—the difficulty in identifying the composition of the gases formed by water electrolysis leads most inventions to use 2:1 as $H_2$:$O_2$ production. The use of the theoretical proportion leads to possible errors in predicting the demand and energy consumption of the engine. In this context, this invention uses an optimized set of electrodes, polarity exchange time, electrolytic solution and applied potential to produce a constant flow of a hydrogen-enriched mixture in a constant proportion of $H_2$:$O_{2;\ preferably}$ 65:35, values determined by gas chromatography with real-time sampling for 300 h. The production of a gas mixture with a known and constant composition ensures accurate calculation of the mass and energy balance.

4-Another problem that makes hydrogen-generating devices unfeasible is the high energy consumption, which reduces the life of the engine's alternator/battery. The electronic control module of the device according to the present invention controls energy consumption according to the engine's operating conditions, taking into account the engine speed and the topography of the road (slope), by consuming energy only when necessary. In addition, the maximum consumption of the device is lower than the engine's extra capacity, equivalent to a radio for listening to music.

5—The injected quantity of the hydrogen:oxygen mixture, in the ratio of 65%: 35%, is adequate, in volume/volume, of the order of 9% of the volume of diesel consumed (hydrogen and oxygen are gaseous and diesel is liquid), so that the economic result was optimized, with the available energy and the useful life of the electrodes.

OBJECTIVES OF THE INVENTION

A hydrogen-generating device/electrolyzer was developed to improve diesel combustion in internal combustion engines that met the following requirements:

presented technical feasibility, since the quantity of hydrogen to be added was compatible with the quantity of energy that could be dedicated by the alternator/battery set of the vehicle engines, without affecting their performance or the useful life of the batteries;

had the heating problems partially mitigated, with the use of low-cost heat exchangers, avoiding the need to interrupt gas production and also controlled the generator temperature by applying adequate potential and controlling the output current, preventing the ignition of hydrogen in the generator;

were able to avoid the undesirable effects of its high flammability, i.e., the early triggering of combustion. To this end, hydrogen is injected into the mixture in an adequate quantity, just enough to help homogenize the fuel mixture and contribute to uniformizing its distribution and combustion in the combustion chamber;

presented a constant composition of the gas mixture for at least 300 h;

presented an improvement in its useful life and in the efficiency of the electrodes, keeping the system stable for at least 300 h; and promoted an optimization of combustion in diesel cycle engines, with less production of combustion residues and consequently less contamination of the lubricating oil and less emission of polluting gases into the atmosphere.

BRIEF DESCRIPTION OF THE DRAWINGS

The following figures illustrate the invention from various aspects:

FIG. 29 shows a comparison between two vehicles used in the study: a Test vehicle equipped with Green Fuel technology and a Control vehicle maintaining its original factory configuration. The figure highlights the main technical characteristics of both vehicles, as detailed in Table 6.

DESCRIPTION

Figure 1:
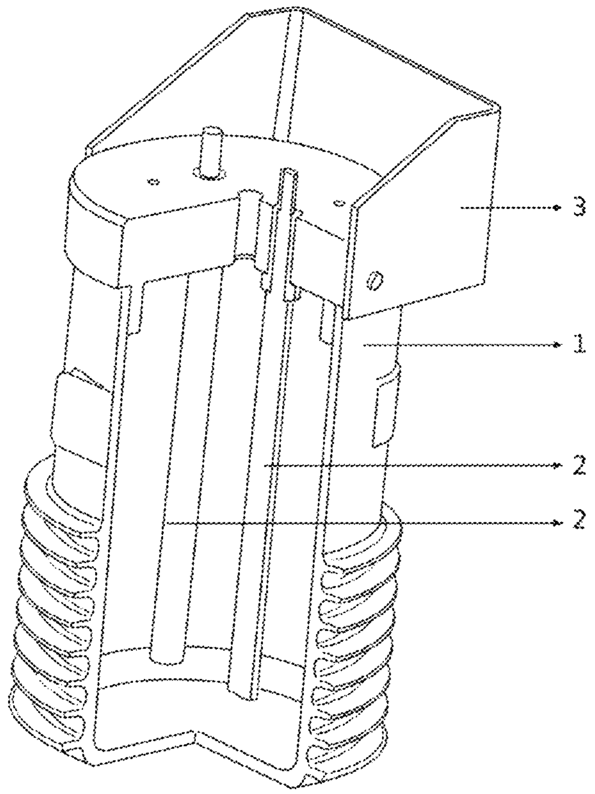
FIG. 1: shows the structure of the water electrolyzer made of aluminum, consisting of a head, two electrodes and a cell designed to receive an electrolyte, with heat exchanger fins on the external wall.

As its objective, the present invention has a hydrogen-generating device, combustion optimizer and pollutant emission reducer in diesel cycle engines, capable of producing an adequate and controlled quantity of hydrogen to be injected into the engine and comprises:

electrolyzer comprising an aqueous electrolytic solution and two electrodes, with periodic alternation of electrode polarity and having heat exchangers on its external part;

system for transporting a mixture of gases containing hydrogen and oxygen;

electronic module for direct control of electrical voltage, with potentiostatic operation and/or galvanostatic or indirect operation, and alternation of electrode polarity that depends on the engine speed and the topography of the location;

wherein said device injects a quantity of up to 10% of a hydrogen:oxygen mixture, in a ratio ranging from 50%: 50% to 70%: 30%, respectively, of hydrogen:oxygen, per liter of diesel consumed in a volume/volume ratio.

This invention relates to a hydrogen-generating device, combustion optimizer and pollutant emission reducer in diesel cycle engines, according to the invention, it generates small quantities of hydrogen to be injected into the engine and comprises:

electrolyzer comprising aqueous electrolytic solution and two electrodes, with periodic alternation of electrode polarity and has heat exchangers on its external part;

system for transporting a mixture of gases containing hydrogen and oxygen;

electronic module for controlling electrical voltage and alternating electrode polarity that depends on engine speed and the topography of the location that operates potentiostatically, with direct potential control, or galvanostatically, with indirect potential control from the output current control;

wherein said device injects a quantity of up to 10% of a hydrogen:oxygen mixture, in a ratio ranging from 50%: 50% to 70%: 30%, respectively, of hydrogen:oxygen, per liter of diesel consumed in a volume/volume ratio.

The device features an alternation of polarity between the electrodes from one to three times per minute, preferably twice per minute.

The hydrogen-generating device is capable of injecting a quantity of up to 10%, preferably up to 9%, and more preferably up to 8% and even more preferably 6% of the hydrogen:oxygen mixture, in the ratio of 65:35, per liter of diesel consumed in a volume/volume ratio.

In mass/mass, the ratio between the hydrogen:oxygen mixture (65%: 35%) and the diesel, in this invention, is of the order of 0.005:1 (5 thousandths). The generator maintenance time was strategically engineered to coincide with the average oil change time of a diesel cycle engine.

The electrolyzer based on cast aluminum alloy has heat exchanger fins on the outside.

The electrolyzer has an optimized electrolytic solution and catalytic electrodes inside. The electrolyzer comprises two electrodes in the same electrolytic solution.

The electrolytic solution may be composed of different concentrations of salts, bases and a stable organic additive. The salts promote ionic mobility, the base added to the salt is responsible for optimizing the pH, while the stable organic additive is responsible for promoting coloration. The non-toxic solution has different formulations, optimized for a commercial solution identified as GFNa, where "N" describes the composition and "a" describes the presence or absence of the additive.

According to a preferred embodiment of the invention, the aqueous electrolyte solution comprises from 0.01 to 0.50 mol $L^{-1}$ of $NaHCO_3$, 0.01 up to 0.50 mol $L^{-1}$ of KOH and even 0.001 to 0.100 mol $L^{-1}$ of an organic additive with formula $C_{16}H_{10}N_2Na_2O_7S_2$, or any other with the same role.

According to another preferred embodiment of the invention, the electrolyte solution comprises: 0.05 to 0.15 mol $L^{-1}$ of $NaHCO_3$, 0.05 up to 0.10 mol $L^{-1}$ of KOH and an additive with formula $C_{16}H_{10}N_2Na_2O_7S_2$ to give an orange color, or any other type of dye with the same role.

Both the anode and the cathode may be composed of materials chosen from the group comprising: transition metals from group d, noble or non-noble metals, stainless steel, glass, thermosetting polymer and carbon, or their alloys. Preferably, for both, stainless steel or derivatives of different stainless steel alloys are used in formats such as: rods, helicoids or cylinders. Preferably, the rod format is used.

The hydrogen-generating device, combustion optimizer and pollutant emission reducer in diesel cycle engines, according to the invention, can be used in a diesel cycle engine with consumption of up to 20 liters/h, and the same vehicle can use one or more devices according to the invention.

For the production of hydrogen and oxygen, or electrolysis of water, the device according to the invention has an energy consumption of less than 3.0 Watts/liter of diesel, and this consumption depends on the operating conditions of the engine.

The hydrogen-generating device, which optimizes combustion and reduces pollutant emissions in diesel cycle engines, according to the invention, contributes to the environment by injecting into the engine a quantity of up to 10% of the hydrogen:oxygen mixture, in the ratio of 65%: 35%, per liter of diesel consumed in a volume/volume ratio. The device has a long useful life due to the periodic alternation of polarity between the electrodes immersed in the electrolyte solution of the electrolyzer, with frequencies that can vary from one to three times per minute. The device has optimized heat exchange due to the presence of external fins in a cast aluminum alloy cell. The assembly produces a flow of a hydrogen/oxygen mixture preferably operating in a 65:35 ($H_2$:$O_2$) ratio of 10 to 50 mL/min, preferably 10 to 30 mL/min, and more preferably operating at an average of 12.5 mL/min in steady state and at 20 mL/min installed in the truck at average rotation on flat ground. Gas production is controlled by an electronic module sensitive to topography and rotation that operates potentiostatically, with direct control of the applied potential, or galvanostatically, with indirect control of potential due to direct control of the output current.

According to a preferred embodiment of the invention, the hydrogen-generating device, which optimizes combustion and reduces pollutant emissions in diesel cycle engines, generates a quantity of up to 9% of hydrogen:oxygen mixture to be injected, per liter of diesel consumed in a volume/volume ratio, and comprises:

electrolyzer with external heat exchanger fins, containing a head with a gas outlet, two electrodes of the same composition immersed in an electrolytic solution in the interior part;

hydrogen transport system to be injected into the engine's air intake system;

electronic control module comprising an electronic board to control:

(a) the direct voltage used in the electrolysis;

(b) the time for alternating the polarity of the electrodes;

(c) the volume of hydrogen to be injected into the engine in a variable manner;

(d) the voltage used in the electrolysis by controlling the module's resistances that respond to the output current; and (e) defines the engine's operating conditions according to its rotation and the topological conditions of the track, without the need for connection to the vehicle's telemetry or WIFI network;

thus injecting a quantity of up to 9% of the hydrogen: oxygen mixture per liter of diesel consumed in a volume/volume ratio.

This invention sought to solve the two main bottlenecks that have made it technically and economically unfeasible to adopt hydrogen-generating devices to improve combustion and reduce pollutant emissions in diesel cycle engines. These bottlenecks are the short lifespan of the electrodes involved in the electrolysis and the rapid deterioration of the engine's alternator/battery assembly.

According to another embodiment of the invention, the device comprises:

an electrolyzer made of aluminum, containing a head with a gas outlet and heat exchanger fins on the outside; and on the inside it comprises an aqueous electrolytic solution with two electrodes of the same composition immersed therein;

hydrogen transport system to be injected into the engine's air intake system;

an electronic control module comprising an electronic board to control:

(a) the direct voltage used in the electrolysis;

(b) the time for alternating the polarity of the electrodes with a frequency of one to three times per minute;

(c) the volume of hydrogen in a mixture of constant hydrogen/oxygen composition to be injected into the engine in a variable manner;

(d) the voltage used in the electrolysis by controlling the module's resistances that respond to the output current; and (e) defines the engine's operating conditions according to its rotation and the topological conditions of the track, without the need for connection to the vehicle's telemetry or WIFI network;

thus injecting a quantity of up to 8% of the hydrogen: oxygen mixture per liter of diesel consumed, in a volume ratio of 65%: 35%, respectively, in a volume/volume ratio.

The device of this invention injects hydrogen into the engine in a variable manner, which is controlled by an electronic board that defines the engine's operating condition, according to its rotation and the topography of the track, without the need for connection to the vehicle's telemetry or WiFi network, which provides reliability and low operating costs for the device. The variation in the hydrogen generation rate aims to prolong the operational condition of the electrolyte and the useful life of the electrodes, as well as reduce energy consumption for the system.

Another innovation of this invention is the periodic and controlled change of the polarity of the electrodes. This is also controlled by the electronic module board that controls the device. With the periodic change of polarity, each electrode works for a period as an anode and then for a period as a cathode. This occurs thousands of times during the operating period and can be adjusted for different frequencies. This strategy minimizes the irreversible oxidation of the anode because the surface oxide is reduced when the polarity is reversed, which increases the stability of the electrodes and allows the use of low-cost materials, such as stainless steel-based alloys. This process assists in maintaining the physical-chemical composition of the electrodes and the electrolytic solution, which enables the production of gases with an unchanged composition throughout the operating period.

Another innovation of this invention is the dual operation of the electronic module, which can work both potentiostatically, with direct control of the voltage applied to the electrodes, and galvanostatically, with indirect control of the voltage due to the maintenance of the output current. In galvanostatic mode, the output current is kept constant, and to achieve this, resistors inserted in the electronic module are automatically exchanged, varying the voltage to deliver the same current, making the output gas flow unequivocally constant throughout the entire operating period. The galvanostatic mode also maintains the generator temperature, since, like the gas flow, the temperature is proportional to the current flowing through the system.

This invention is characterized by the injection of an adequate amount of hydrogen into hydrocarbon-based fuels, through a hydrogen-generating device, for use in diesel cycle engines, meeting at least 3 of the following parameters:

Improve combustion, making it more complete, by providing greater homogeneity of the fuel mixture and greater uniformity of its dispersion in the combustion chamber. To achieve this objective, the device of this invention must inject up to 10% of a hydrogen:oxygen mixture per liter of diesel consumed, in volume/volume.

The mixture containing hydrogen and oxygen must have a stoichiometric proportion ranging from 50%: 50% to 70%: 30%, respectively.

Generate hydrogen and oxygen with energy consumption of less than 3.0 Watts/liter of diesel consumed by the engine, so as not to affect the useful life of the alternator/battery assembly of the engines and not to raise the temperature in the hydrogen generator to prevent evaporation of the electrolyte.

Have a useful life of the electrode assembly and the alternator/battery assembly of more than 300 technical hours of engine operation.

Provide a reduction in diesel oil consumption of more than 7%, in an engine consuming up to 8 l/h of diesel.

Significantly reduce the emission of pollutant residues from diesel cycle engines, especially particulate matter and $NO_x$. For the purposes of this invention, the device must provide a reduction in particulate matter emissions greater than 60% and a reduction in $NO_x$ emissions greater than 50%.

In a preferred version, the hydrogen generator and injector device for diesel cycle engines of this invention is characterized by meeting at least 4 of the following parameters:

Improve combustion, making it more complete, by providing greater homogeneity of the fuel mixture and greater uniformity of its dispersion in the combustion chamber. To achieve this objective, the device of this invention must inject an amount of up to 9% of the hydrogen:oxygen mixture per liter of diesel consumed, in volume/volume.

The mixture containing hydrogen and oxygen must have a stoichiometric proportion ranging from 60%: 40% to 70%: 30%, respectively.

Generate hydrogen and oxygen with energy consumption of less than 2.5 Watts/liter of diesel consumed by the engine, so as not to affect the useful life of the alternator/battery set of the engines and not to raise the temperature in the hydrogen generator to avoid evaporation of the electrolyte.

Have a useful life of the electrode assembly and the alternator/battery assembly of more than 400 technical hours of engine operation.

Provide a reduction in diesel oil consumption of more than 6%, in an engine consuming up to 10 l/h of diesel.

Significantly reduce the emission of pollutant residues from diesel cycle engines, especially particulate matter and $NO_x$. For the purposes of this invention, the device must provide a reduction in particulate matter emissions greater than 50% and a reduction in $NO_x$ emissions greater than 40%.

In an even more preferred embodiment, the hydrogen-generating device for combustion engines of this invention is characterized by meeting each of the following parameters:

Improve combustion, making it more complete, by providing greater homogeneity of the fuel mixture and greater uniformity of its dispersion in the combustion chamber. To achieve this objective, the device of this invention must inject an amount of up to 8% of the hydrogen:oxygen mixture per liter of diesel consumed, in volume/volume.

The mixture containing hydrogen and oxygen must have a stoichiometric ratio of 65%: 35, respectively.

Generate hydrogen and oxygen with energy consumption of less than 2.0 Watts/liter of diesel consumed by the engine, so as not to affect the useful life of the alternator/battery assembly of the engines and not to raise the temperature in the hydrogen generator to prevent evaporation of the electrolyte.

Have a useful life of the electrode assembly and the alternator/battery assembly of more than 500 technical hours of engine operation.

Provide a reduction in diesel oil consumption of more than 5%, in an engine with consumption of up to 12 l/h.

Significantly reduce the emission of pollutant residues from diesel cycle engines, especially particulate matter and $NO_x$. For the purposes of this invention, the device must provide a reduction in particulate matter emissions greater than 50% and a reduction in $NO_x$ emissions greater than 40%.

The device of this invention is preferably composed of the following parts:

(a) electrolytic cell with heat exchanger fins, where the electrolytic solution is located. This container can be made of metal alloys or even glass or plastics, preferably cast aluminum alloy.

(b) pair of electrodes, on which an electric potential is applied and through which the electric current will circulate during the electrolysis of the solution contained in the electrolytic cell. These electrodes are rod-shaped and are made of alloys or non-noble metals, alloys or non-alloys of d-block metals, preferably stainless steel-based alloys.

(c) electronic module that controls the electrical voltage, directly in potentiostatic mode or indirectly in galvanostatic mode, used in electrolysis and the periodic alternation of electrode polarity. Both variables depend on the engine's operating condition, which takes into account the engine speed and the track topography. In other words, the upward or downward slope of the track, without the need to be connected to the vehicle's telemetry or WiFi system.

(d) hydrogen transport and injection system in the intake air.

(e) non-toxic electrolytic solution, composed of water, salts, bases and additive, in order to provide maximum electrolysis efficiency, facilitating the hydrogen and oxygen evolution reactions catalyzed by the electrodes in order to produce the gas mixture in the pre-established composition.

Figure 2:
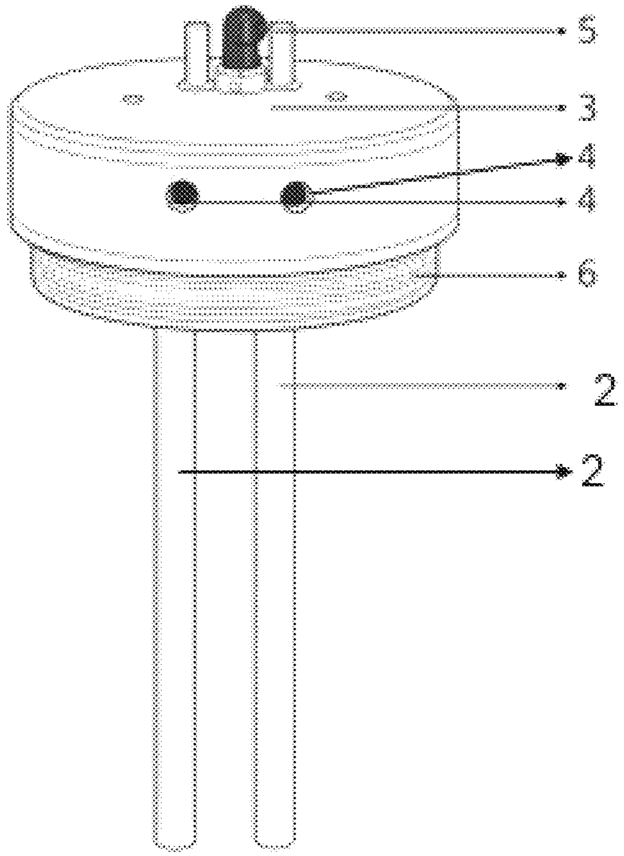
FIG. 2: shows the detailed assembly of the head containing the electrodes.
Figure 3:
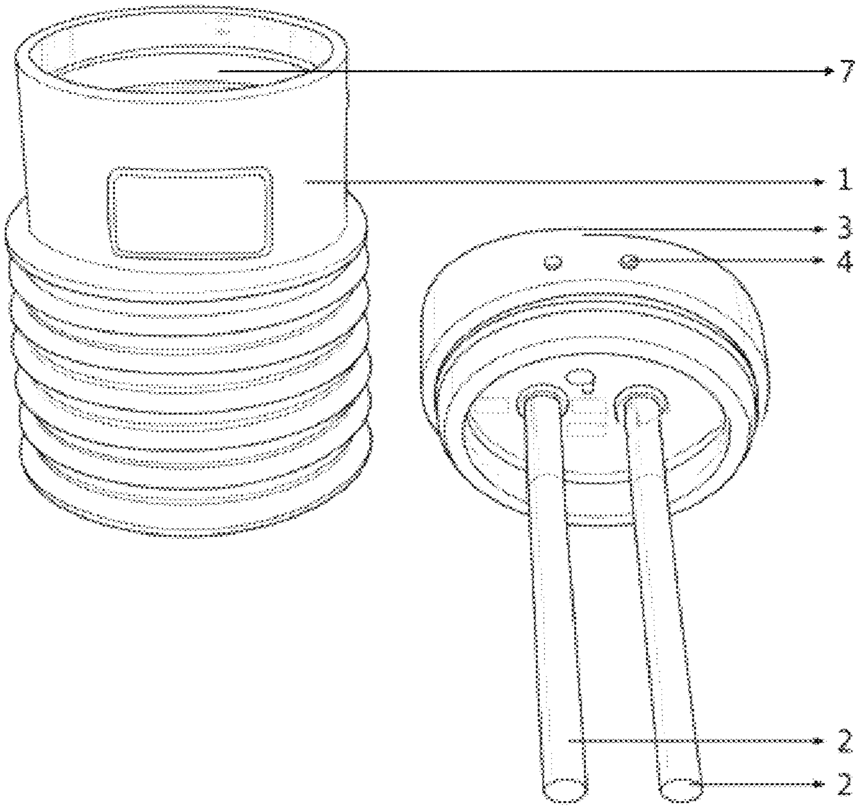
FIG. 3: shows the complete disassembled assembly of the water electrolyzer.

FIGS. 1, 2 and 3, attached, show the construction details of the hydrogen-generating device, according to this invention.

FIG. 1 illustrates the water electrolyzer, or hydrogen generator in a mixture with oxygen. The generator consists of an electrolyzer cell (1) made of cast aluminum with heat exchanger fins on the outside, two electrodes (2) made of stainless steel, which can be made of different alloys, a machined aluminum head (3) adapted to receive the electrodes and a fixing bracket in one single mobile part. The head has polymeric bushings specially designed to keep the system thermodynamically closed.

FIG. 2 illustrates a photograph of the generator head assembly (3), containing two turned holes (4) for fitting the fixing bracket, the two electrodes (2) made of stainless steel, which can be made of different alloys, the gas exhaust connection (5) equipped with a quick coupling and the thread for fitting (6) the assembly into the cell.

FIG. 3 illustrates a photograph of the complete water electrolyzer assembly. The electrolyzer (1) made of cast aluminum with heat exchanger fins on the outside has a compartment to receive the electrolyte (7). Electrolyzer that contains a machined aluminum head (3) with turned holes (4) to receive the fixing support and the pair of electrodes (2) with a steel base, which can be of different alloys.

Figure 4:
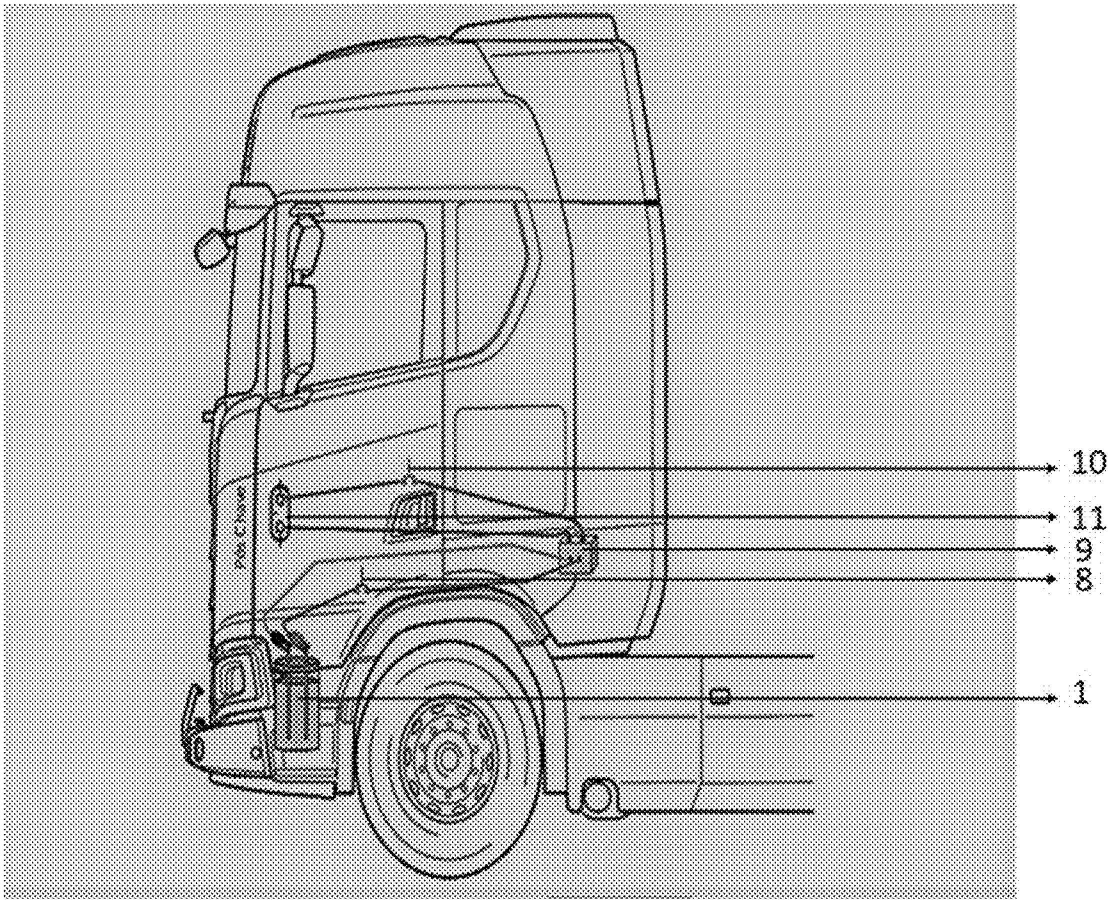
FIG. 4: shows the installation diagram of the water electrolyzer and the electronic module.

FIG. 4 illustrates the installation diagram of the water electrolyzer and the electronic module. The electrolyzer (1) is installed on the truck chassis, on the left passenger side, below the driver's cabin, between the engine/radiator and the tire, very close to the front panel, on a steel frame. Alternatively, an output current controller (8) can be installed. The electronic module (9) can be installed under the sofa bed, inside the cabin, on the left passenger side, on an internal wooden wall; for those trucks that contain the above-mentioned parts. Other easily accessible locations can be suggested. Another input current controller (10) can be installed. Finally, the device is installed on the truck's key post (11), which powers the entire system.

Figure 5:
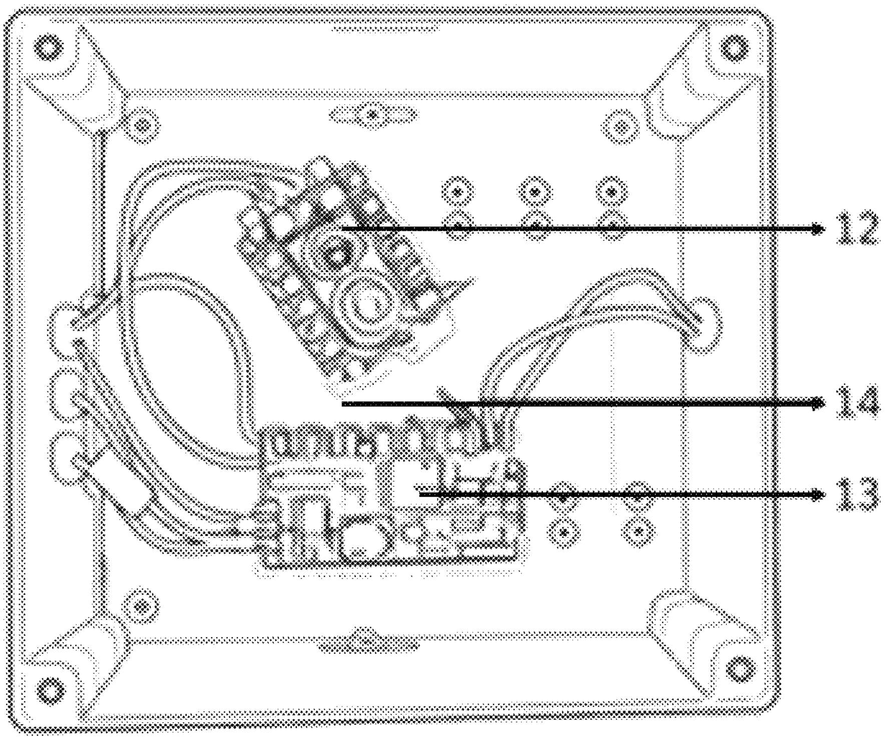
FIG. 5: shows a photograph of an example of an electronic module that automatically controls the hydrogen demand and is responsible for the stability of the electrodes.

FIG. 5 shows a photograph of the internal part of a model of the electronic module, consisting briefly of a buck module (12), capable of controlling the potential received by the alternator/battery pair (or by the test source) and sent to the hydrogen generator, by a microcontroller (13) and by a voltage regulator (14).

Figure 6:
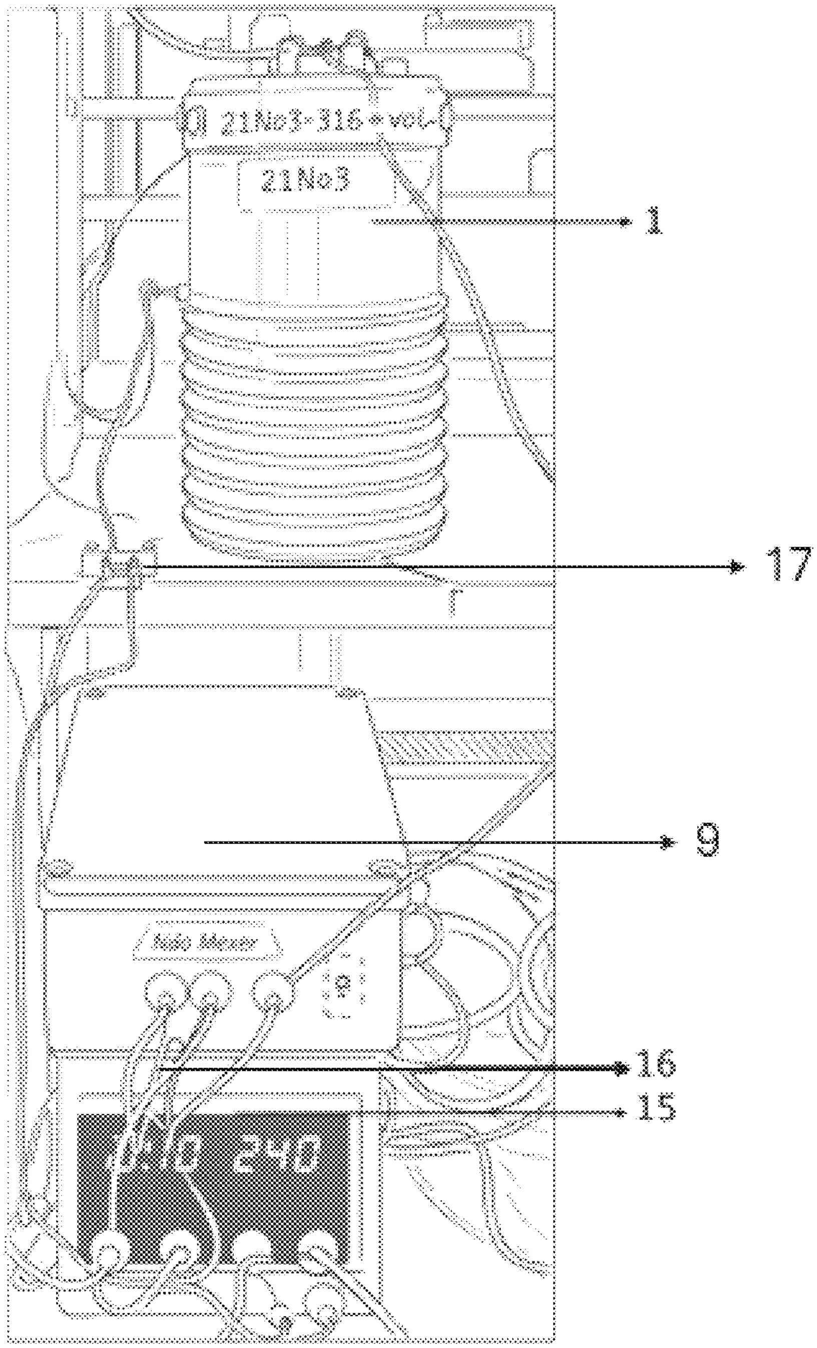
FIG. 6: shows a photograph of a bench test model, containing a test source, electronic module, an electrolysis cell and the cabling.

FIG. 6 shows a photograph of a set of a test model. In this example, a test voltage power supply (15) applies a potential difference of 24 V, with a current response of 0.63 A, as a result of the conversion of potential made by the electronic module (9) and applied to the electrodes of the hydrogen generator (2), as 13.8 V, via test wiring (16). These values configure only an example, not limited to them. The test current measurement is made with a multimeter, with the aid of a switch (17). The potential is measured with a multimeter directly at the electrodes, while the gas flow is measured by connecting the outlet hose to a volumetric flowmeter calibrated for the specific composition of the hydrogen/oxygen mixture produced by this invention.

Figure 7:
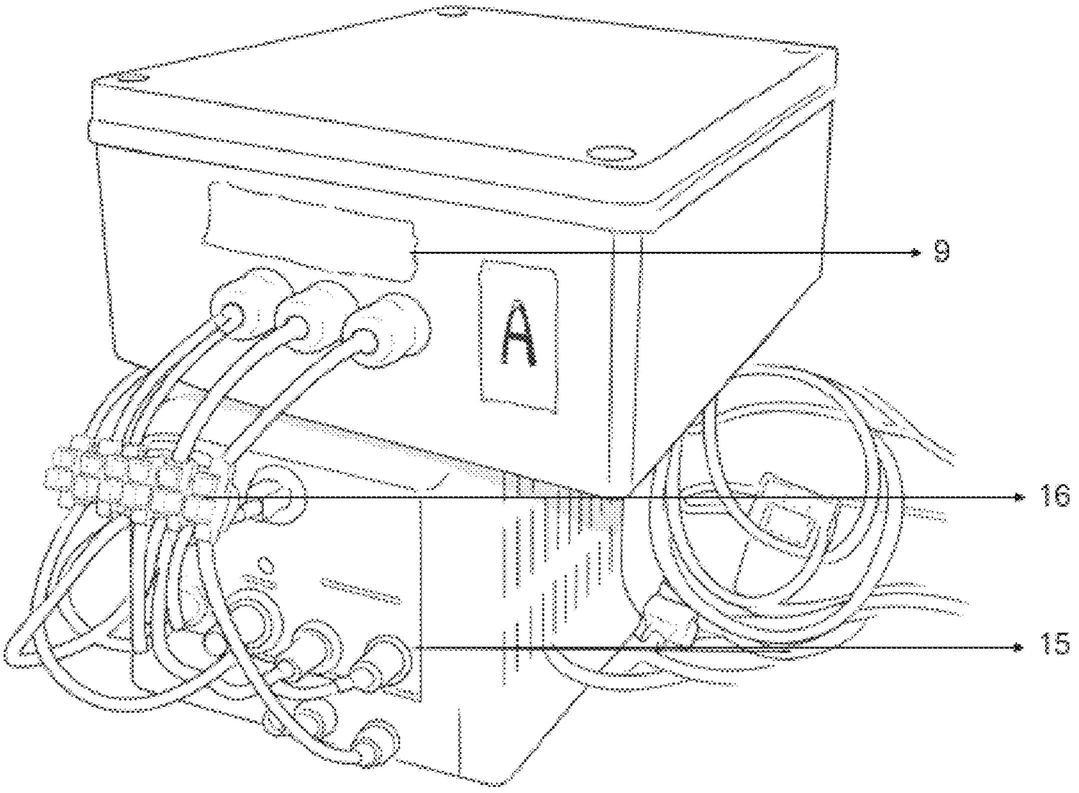
FIG. 7: shows a close-up photograph of an electronic module plus voltage source assembly for bench testing.

FIG. 7 shows a close-up photograph of a model of the electronic module (9), the voltage source (16) and the test cabling (16) on a bench. In this bench test model, the electrolysis cell is connected to the module, which is connected to the voltage source.

The electronic module ensures that the system only turns on when the engine is running, controls the energy to be supplied to the system so that hydrogen production is consistent with operational demand, and promotes periodic changes in the polarity of the electrodes to optimize their use and useful life.

The foundations that support the operation of this invention are based on the use of an adequate amount of hydrogen to be injected into the intake air to optimize combustion in diesel cycle engines. This aims to produce a series of micro hydrogen explosions, which contribute to homogenizing the fuel mixture and standardizing dispersion in the combustion chamber, without consuming significant parts of the oxygen necessary for the combustion of hydrocarbons.

Because it has a lower ignition temperature than diesel, hydrogen explodes a little before it. However, since the quantity of hydrogen is adequate, its explosion does not consume a significant amount of oxygen from the fuel mixture, as would occur if the hydrogen concentration were higher. Thus, with the high diffusion speed of its flame, there is greater homogenization of the fuel mixture (diesel oil and oxygen) and greater uniformity of its distribution throughout the chamber. This is intended to provide more complete combustion, with greater conversion of thermal energy from the fuel into driving force and, consequently, lower emission of polluting gases, soot and partially oxidized compounds in general.

In order not to compromise the useful life of the alternator/battery assembly, the device of this invention must not consume more than 3 Watts/liter of diesel oil consumed by the engine.

By promoting an optimization of combustion in diesel cycle engines, there is less formation of combustion residues, thus reducing contamination of the lubricating oil. In other words, the device of this invention can also provide an increase in the lubricating oil change period and engine durability.

An example is provided below to better characterize the scope of the invention, and it should not be used for limiting purposes of the invention.

Example

Tests were performed on 8 different diesel engines, equipped with one or more hydrogen generator/injector devices, according to this invention. The devices used were the same, sized for engines of up to 400 hp and consumed up to 12 Watts/hour each, according to the engine's operating conditions, captured by the electronic control module of the devices tested. Depending on the power of the engine tested, one or more devices were used, so that each device met up to 400 hp of the engine's capacity.

The installations in the vehicles were made using a hydrogen-generating and pollutant emission-reducing device characterized by:

- an electrolyzer made of aluminum with an internal diameter of 12.5 cm and a height of 20.0 cm, containing heat exchanger fins on the outside, and closed with a head with a gas outlet connected to a Nylon/tecalon hose with an external diameter of 0.6 cm connected to the engine air intake chamber.
- two ½-inch cylindrical electrodes measuring 23.0 cm in length, with 5.5 cm of thread separated by 5.0 cm between centers, made of 316L stainless steel immersed in 2 L of aqueous $NaHCO_3$electrolyte with a concentration of 0.05 mol $L^{-1}$.
- and an electronic module in potentiostatic configuration to control 13.8 V of potential applied between the electrodes and to reverse the polarity of the electrodes every 2 minutes.

Table 1 indicates the equipment tested WITHOUT and WITH the device according to the invention (GF). Table 1 also shows the volume and power specifications of each engine, as well as the type of use for which it was intended. The table also informs the duration, in kilometers driven or machine hours worked, of use of the engines WITHOUT and WITH the activation of the device of this invention (GF), in order to produce statistically reliable results for comparison. Finally, the table shows the diesel and hydrogen consumption of the engines during the test period.

TABLE 1

Table 1 - Equipment Tested WITHOUT and WITH the GF Device

| Vehicle | Engine | With GF | Running (km) | Diesel (liters) | Hydrogen (liters) |
|---|---|---|---|---|---|
| M1 - Truck | 13 l | | 6,538 | 2,443 | |
| | 400 cv | X | 20,579 | 6,764 | 359 |
| M2 - Truck | 6 l | | 6,525 | 2,207 | |
| | 310 cv | X | 26,378 | 7,636 | 435 |
| M3 - Truck | 6 l | | 6,351 | 2,073 | |
| | 250 cv | X | 16,921 | 4,881 | 278 |
| M4 - Truck | 4 l | | 4,553 | 891 | |
| | 160 cv | X | 11,139 | 1,799 | 144 |
| M5 - Truck | 4 l | | 210 (h) | 1,678 | |
| | 170 cv | X | 81 (h) | 560 | 32 |
| M6 - Wheel | 6 l | | 1,017 (h) | 1,032 | |
| Loader | 175 cv | X | 473 (h) | 455 | 185 |
| M7 - Generator | 69 l | | 18 (h) | 4,824 | |
| | 1670 cv | X | 18 (h) | 4,626 | 28 |
| M8 - Boat | 49 l | | 32 (h) | 2,390 | |
| | 2000 cv | X | 28 (h) | 2,223 | 44 |

The results in Table 1 show that engines M1 to M5 were installed in commercial trucks from a fleet used to transport tractors and tow trucks for automobiles. Engine M6 was installed in a loader of a mining company and engines M7 and M8 were stationary engines.

Table 2 shows the amount of hydrogen that was injected per liter of diesel consumed in each engine, during the period in which it was tested with the device of this invention activated. From the results presented, it can be observed that the injection of hydrogen, per liter of diesel consumed, varied from 1% to 8%, in volume/volume.

Table 2 also shows that the energy consumed by the device of this invention varied from 0.2 to 2.2 Watts/liter of diesel consumed by the engine when operating with the device (GF) activated. Engines M1 to M6 were tested with only one device installed, while engines M7 and M8 were tested with 4 devices installed.

TABLE 2

Table 2 - Quantities of Hydrogen and Electricity Used

| | | | | Energy Consumed | |
|---|---|---|---|---|---|
| Vehicle | Engine | With GF | Hydrogen(*)/ Diesel vol/vol | Device (Watts/ hour) | Watts/ l of Diesel |
| M1 - Truck | 13 l | | | | |
| | 400 cv | X | 5.31% | 11.0 | 1.5 |
| M2 - Truck | 6 l | | | | |
| | 310 cv | X | 5.70% | 11.0 | 1.6 |
| M3 - Truck | 6 l | | | | |
| | 250 cv | X | 5.70% | 11.0 | 1.6 |
| M4 - Truck | 4 l | | | | |
| | 160 cv | X | 8.00% | 11.0 | 2.2 |
| M5 - Truck | 4 l | | | | |
| | 170 cv | X | 4.90% | 11.0 | 1.4 |
| M6 - Wheel | 6 l | | | | |
| Loader | 175 cv | X | 3.90% | 11.0 | 1.1 |
| M7 - | 69 l | | | | |
| Generator | 1670 cv | X | 1.02% | 44.0 | 0.2 |
| M8 - Boat | 49 l | | | | |
| | 2000 cv | X | 1.25% | 44.0 | 0.8 |

(*)mixture of hydrogen:oxygen, in the ratio of 65%:35%.

Table 3 shows the reduction in diesel consumption and pollutant emissions, measured by opacity, by the engines tested, when operating with the devices of this invention activated.

The results presented in Table 3 show that the reduction in diesel consumption ranged from 4.1% to 17.5% when operating with the devices of this invention (GF) activated. Factors such as the type of work performed and the technological modernity of the engines are factors that certainly explain the variations in consumption reduction observed. However, all the engines tested showed economically significant reductions in diesel consumption, which makes the use of the device of this invention viable.

TABLE 3

Reduction in Diesel Consumption and Pollutant Emissions

| Vehicle | Engine | With GF | Diesel Consumption (l/100 km) | Diesel Consumption (l/h) | Diesel Consumption Reduction (%) | Opacity Rate | Opacity Reduction (%) |
|---|---|---|---|---|---|---|---|
| M1 - Truck | 13 l | | 37.4 | | 12.0% | 0.27 | 85% |
| | 400 cv | X | 32.9 | | | 0.04 | |
| M2 - Truck | 6 l | | 33.8 | | 14.4% | 3.43 | 93% |
| | 310 cv | X | 28.9 | | | 0.25 | |
| M3 - Truck | 6 l | | 32.6 | | 11.6% | 2.28 | 65% |
| | 250 cv | X | 28.8 | | | 0.79 | |
| M4 - Truck | 4 l | | 19.6 | | 17.5% | 0.26 | 46% |
| | 160 cv | X | 16.2 | | | 0.14 | |
| M5 - Truck | 4 l | | | 8.0 | 12.9% | 1.10 | 40% |
| | 170 cv | X | | 7.0 | | 0.66 | |
| M6 - Wheel Loader | 6 l | | | 10.1 | 5.1% | 0.46 | 98% |
| | 175 cv | X | | 9.6 | | 0.01 | |
| M7 - Generator | 69 l | | | 268.0 | 4.1% | 0.20 | 95% |
| | 1670 cv | X | | 257.0 | | 0.01 | |
| M8 - Boat | 49 l | | | 132.8 | 7.0% | | |
| | 2000 cv | X | | 123.5 | | | |

Table 3 also shows significant reductions in particulate pollutant emissions when each engine operated with the device activated. These emissions could be measured by varying the opacity of the emissions. The results presented in Table 3 show that the reduction in particulate pollutant emissions ranged from 40 to 98%. This is highly significant.

Although it is difficult to assess the economic return on reducing particulate pollutant emissions, there is no doubt that this is an environmental need and would justify the requirement for a green patent for this invention. This invention characterizes a device capable of reducing fuel consumption and mitigating pollutant emissions in diesel cycle engines.

Analysis of the outlet gases and operating conditions of the electrolyzers.

The chemical composition of the mixture of outlet gases from the electrolyzers covered in this example was evaluated.

These devices were individually connected to three voltage sources for 406 uninterrupted hours. The gas composition was determined by using a gas chromatograph model 310C from SRI Instruments. The samples were analyzed by a TCD detector after passing through a Molecular Sieve 5A column for gas separation, at a temperature of 60° C. For each sample, 50 μL of the gas generated inside the reactor was collected using a chromatographic syringe. To correlate the peak area of the chromatogram for each identified gas with its respective number of moles, calibration curves were constructed by injecting known volumes of gases with a purity of 99.999%. The gases used were: a mixture of 7% $H_2$ in Ar and synthetic air (20% 02+80% $N_2$), both with purity grade 5.0 (99.999%), obtained from White Martins. Additionally, the cells were monitored for input current at the source, output current at the electrolyzer and potential applied between the electrodes.

The morphology and relative chemical composition of the electrode surfaces were investigated by using a JEOL Scanning Electron Microscope (SEM) model JSM-6380LV and a Thermo Scientific Energy Dispersive X-ray Spectroscopy (EDS) system model Noran System Six coupled to the SEM. The steel electrodes were investigated immediately after the 406-h stability test.

Analysis of the Outlet Gases and Operating Conditions of the Electrolyzers

Figure 8:
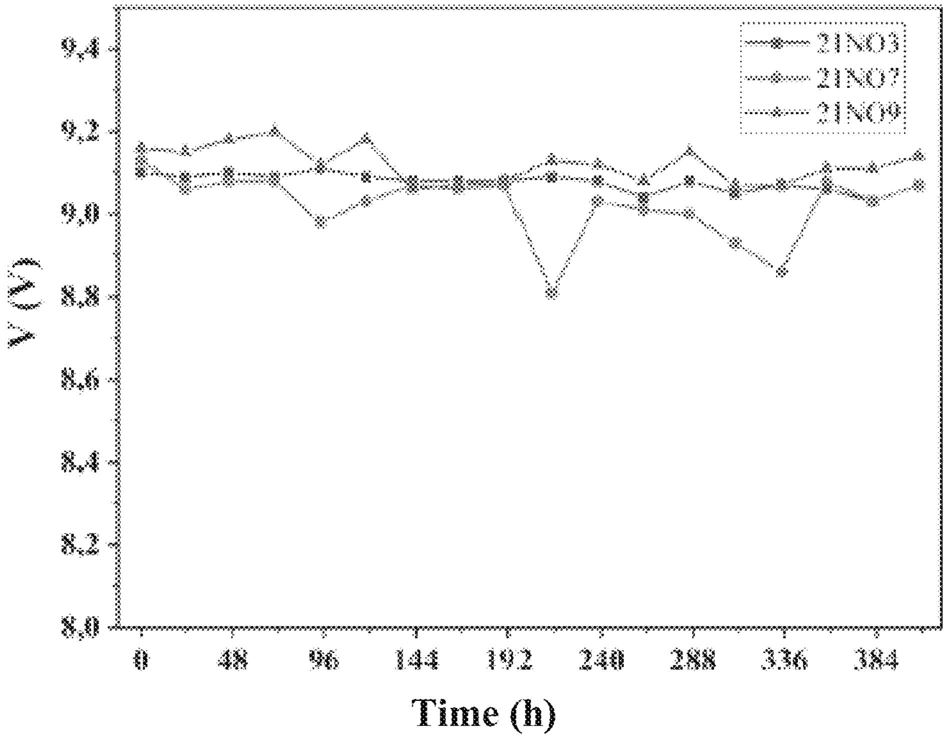
FIG. 8: shows the representative behavior of the potential experienced by the pair of electrodes of the electrolyzers as a function of time.

The electrolyzers were monitored in constant operation for a period of 406 hours. FIG. 8 illustrates the potential values applied by the external source as a function of time for each of the three electrolyzers studied. It is noted that one of the devices, the 21NO7, obtained lower temporal stability of the applied voltage when compared to the others studied. Among the evaluated devices, the 21NO3 operated under more stable conditions of applied potential as a function of time. Despite small fluctuations, the external sources provided average voltages of 9.08±0.02 V, 9.05±0.06 V and 9.12±0.04 V for the 21NO3, 21NO7 and 21NO9 devices, respectively.

Figure 9:
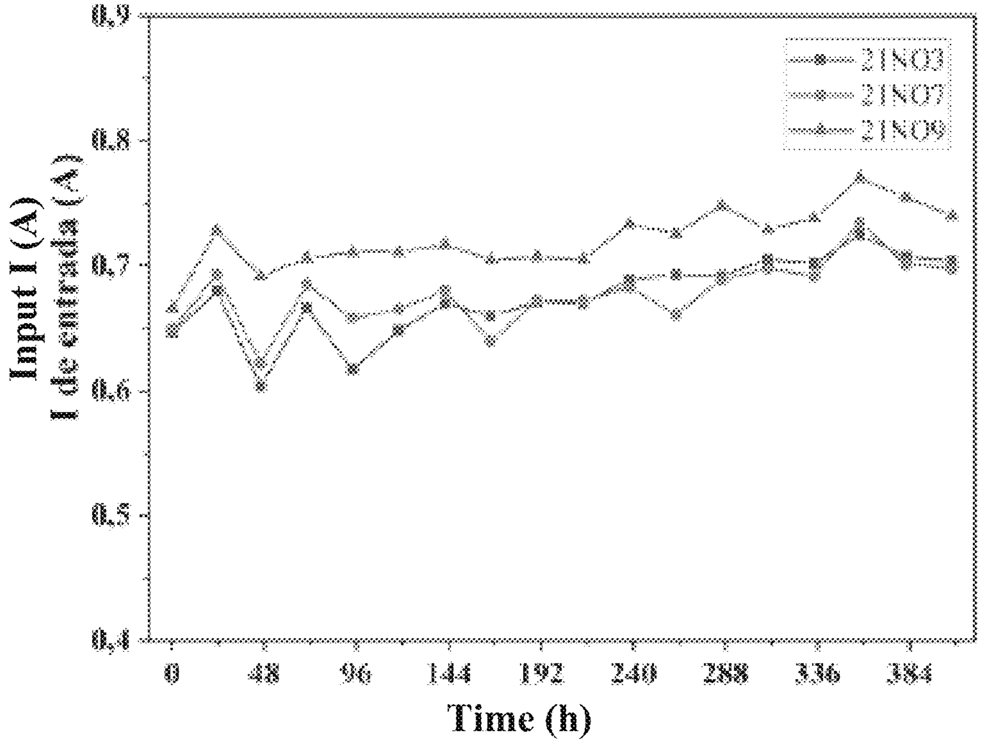
FIG. 9 and FIG. 10: show the representative behavior of the input current (left) and output current (right) of the electrolyzers as a function of time.
Figure 10:
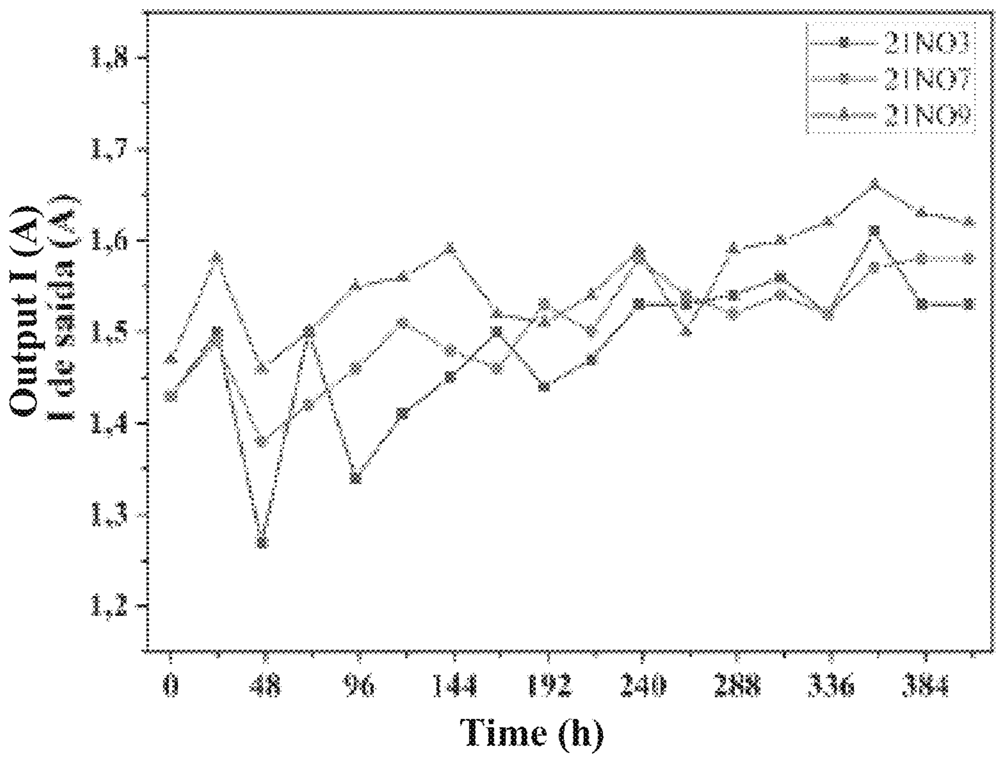

The input and output currents (experienced by the electrodes) were also monitored as a function of time, as illustrated in FIGS. 9 and 10. The input current (left) presented average values of 0.68±0.02 V, 0.68±0.02 V and 0.72±0.02 A for the 21NO3, 21NO7 and 21NO9 devices, respectively. All cells, therefore, operated with a standard deviation of the average current value below 4%, which is quite acceptable. Similar behavior was observed for the output current, whose average values were 1.50±0.06 V, 1.52±0.05 V and 1.57±0.05 A for the 21NO3, 21NO7 and 21NO9 devices, respectively. Thus, after detailed analysis, it was observed that the 21NO3 and 21NO7 devices operated under almost identical conditions of applied potential, input current and output current. The 21NO9 device, despite also presenting reasonable stability, operated under slightly higher current and voltage conditions than the other two. Moreover, it was observed that both the input current and the output current showed a slight tendency to increase as a function of the operating time of the devices, regardless of which one in particular. This increase in current may be related to the internal temperature of the electrolyte, which needs to be further investigated.

Figure 11:
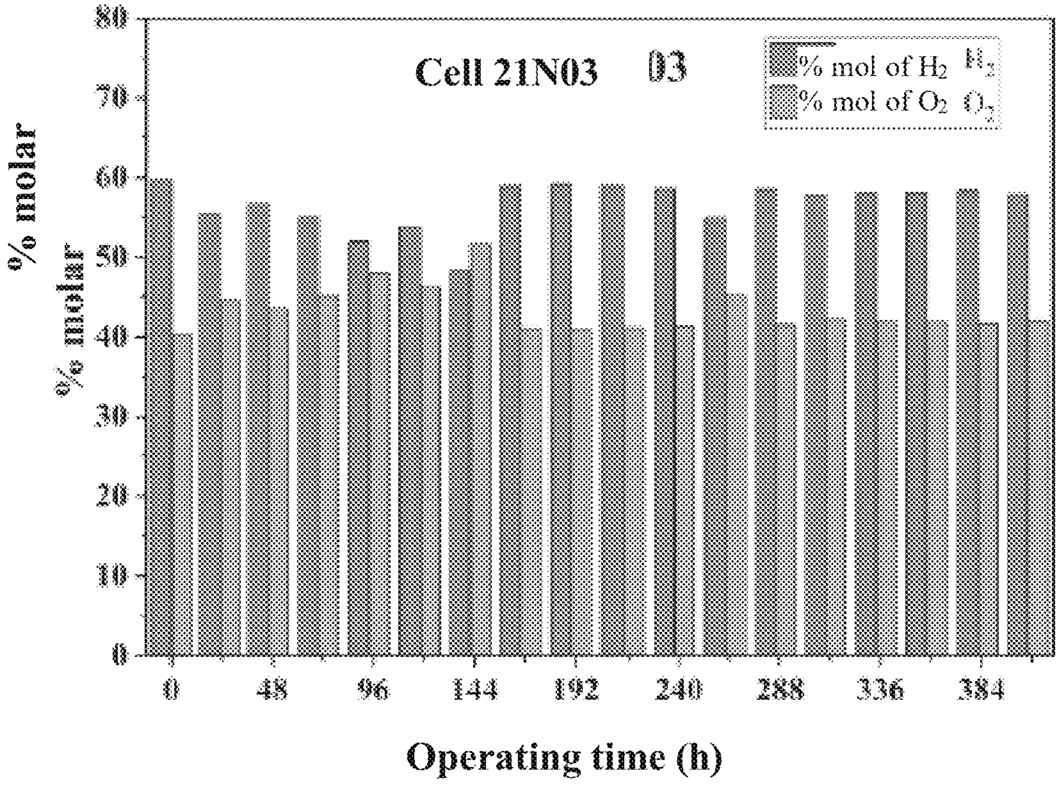
FIG. 11: shows the variation in gas composition, in molar percentage, as a function of the operating time of the 21NO3 electrolyzer. The measurements were performed by gas chromatography and quantified with an external calibration curve.

In addition to the electrical operating properties, the electrolyzers were evaluated for the gases produced as a function of time. Measurements of the gas composition were taken every 24 h for a total period of 406 h. FIG. 11 shows the results obtained for the 21NO3 device, which presented continuous production of $H_2$ and $O_2$ throughout the investigated interval, as expected in view of equations 2 and 3. The initial production presents a composition of approximately 60% Hz to 40% $O_2$. The production of $H_2$ is greater than $O_2$ throughout the test, which attests to the effective use of the electrodes as cathode or anode during polarization inversion. Despite an observed instability in the first 144 h of operation, where the relative $O_2$ concentration increased from 40 to almost 54%, the 21N03 device stabilized from that point on, delivering a gas mixture with an almost constant composition and close to 60% $H_2$ and 40% $O_2$ (FIG. 11).

Figure 12:
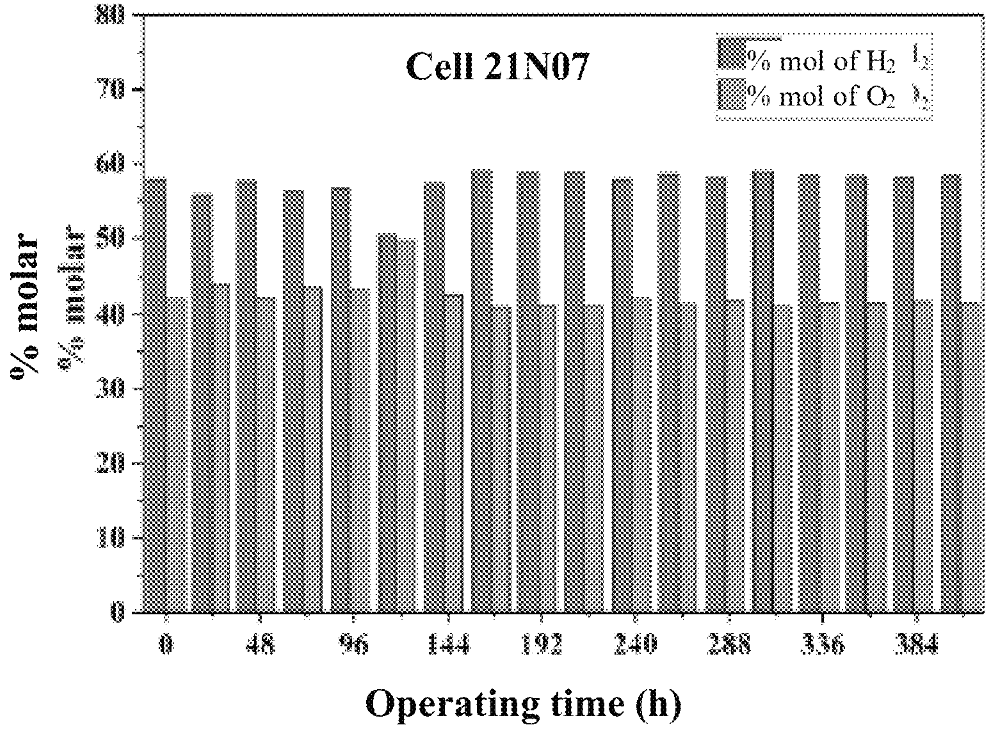
FIG. 12 and FIG. 13: show the variation in gas composition, in molar percentage, as a function of the operating time, for the 21NO7 (FIG. 12) and 21NO9 (FIG. 13) electrolyzers. The measurements were performed by gas chromatography and quantified with an external calibration curve.
Figure 13:
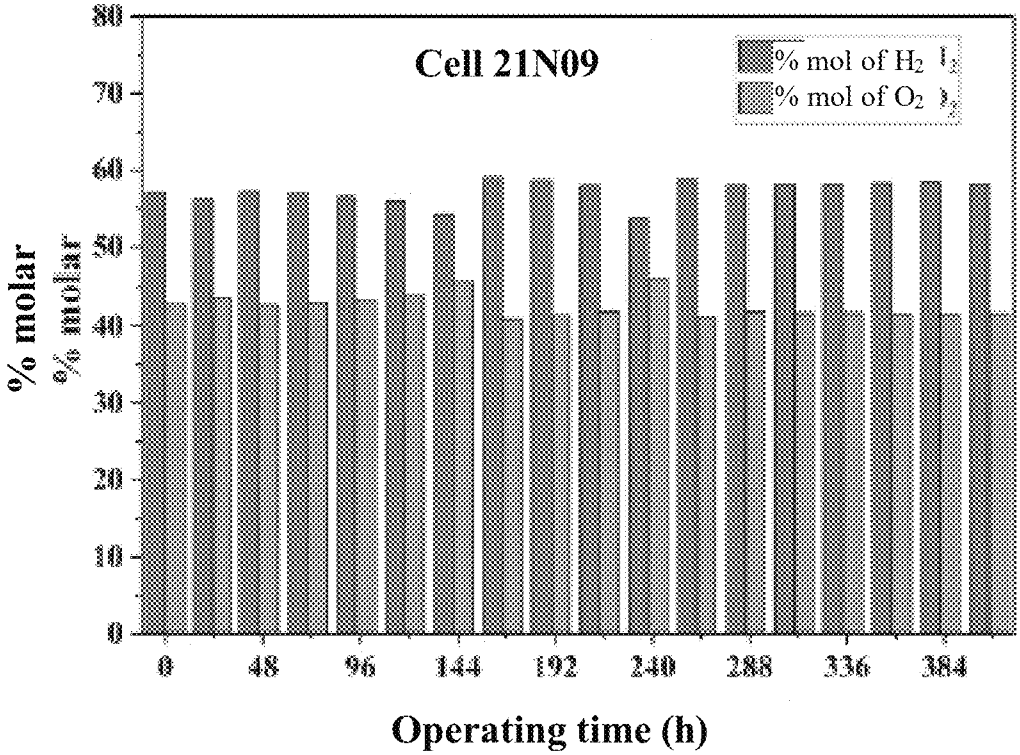

For comparison purposes, FIGS. 12 and 13 show the results obtained for devices 21N07 and $21N_{09}$. As shown, all three devices operated stably during the 406 h of investigation, delivering around 60% $H_2$ and 40% $O_2$ in the exhaust gas mixture.

Figure 14:
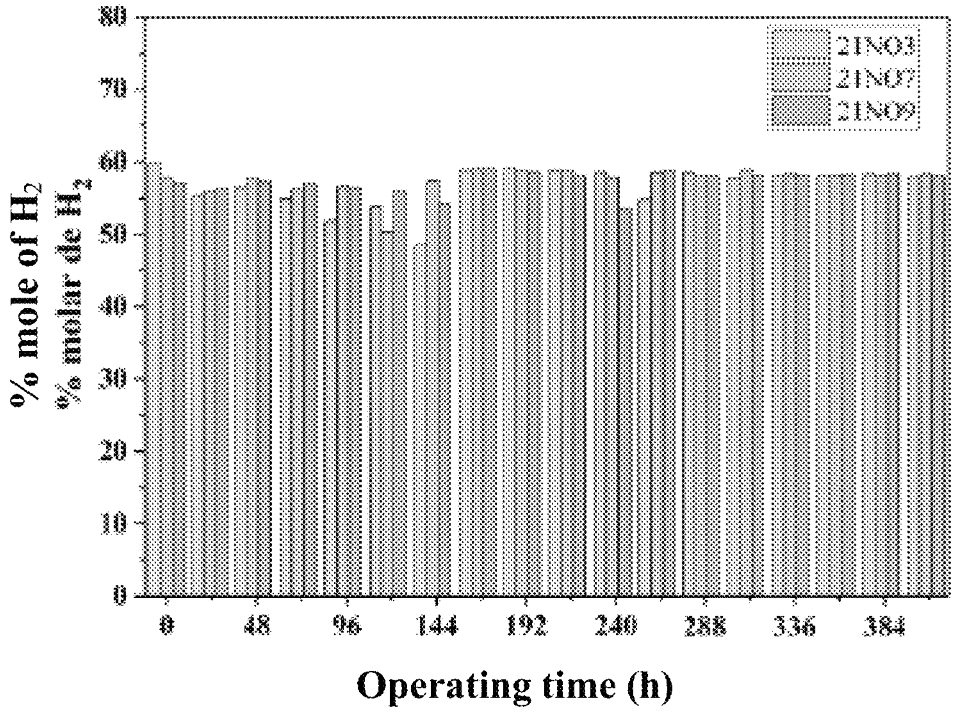
FIG. 14 and FIG. 15: show the variation in the molar percentage of H2 (FIG. 14) and molar ratio $H_2$:$O_2$ (FIG. 15) for the three electrolyzers under study, as a function of the operating time. The measurements were performed by gas chromatography and quantified with an external calibration curve.

FIG. 14 shows a comparison of the molar percentage of $H_2$ produced in each device as a function of time. This result makes it more evident that device 21NO3 showed greater instability in the first 06 days of operation. Soon after this period, all electrolyzers delivered similar percentages of $H_2$ as a function of time, with no signs of a decrease in $H_2$ production for long periods of operation.

Figure 15:
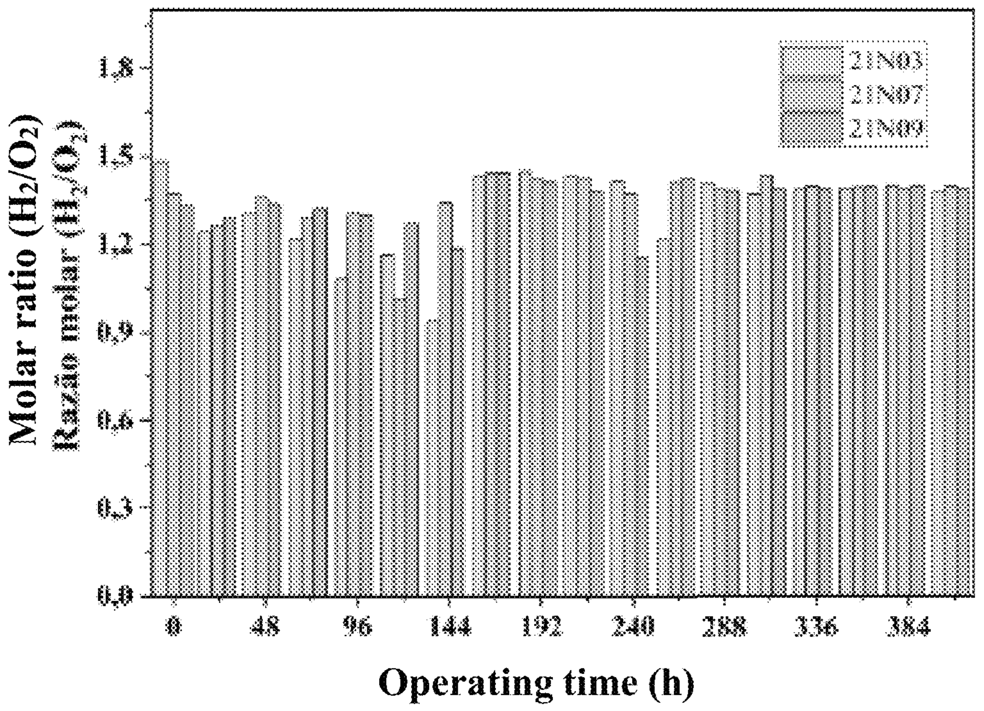

The composition of the gas mixture can also be interpreted by the $H_2/O_2$ molar ratio, as shown in FIG. 15. In this context, the higher the ratio, the greater the production of $H_2$ in relation to $O_2$. Except for one singular point at 144 h for the 21NO3 device, all devices presented the presence of ratios greater than unity during the operating period, ensuring the majority production of $H_2$.

Analysis of Morphology and Elemental Chemical Composition

Figure 16:
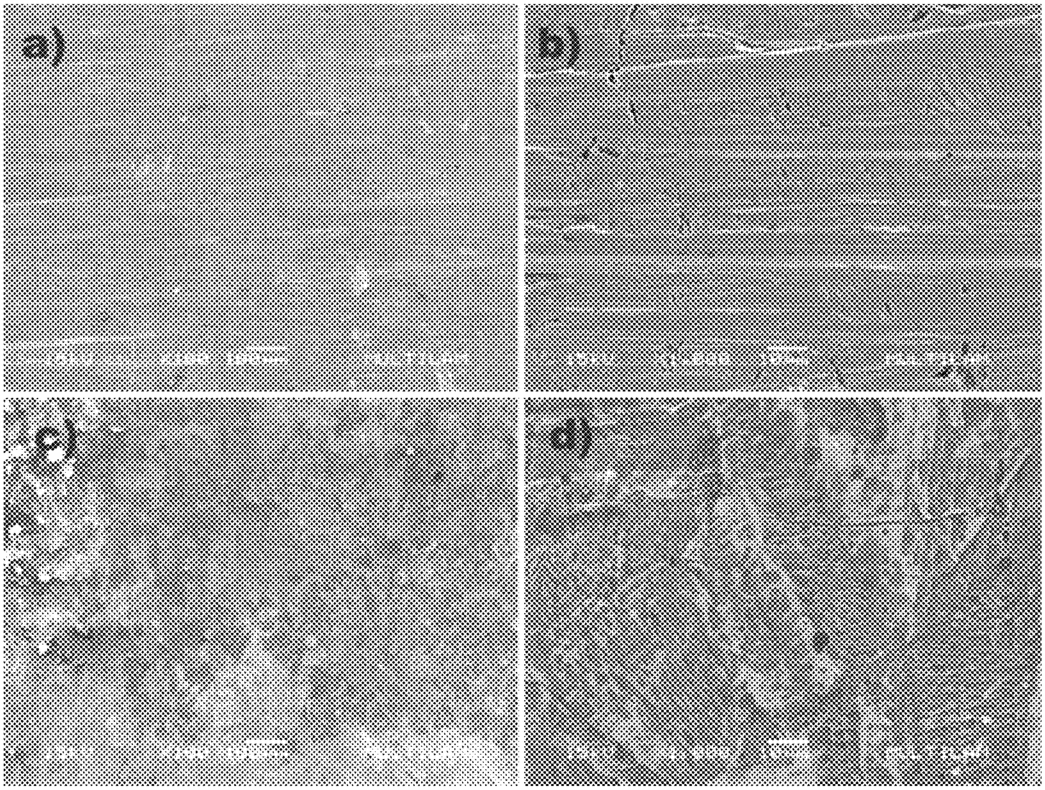
FIG. 16: shows representative SEM images of the electrode surface, where a) is the micrograph before the electrolysis process, obtained at 100× magnification; b) before the electrolysis process, obtained at 1000× magnification; c) after 406 hours of electrolysis, obtained at 100× magnification; and d) after 406 hours of electrolysis, obtained at 1000× magnification.

As shown in scanning electron microscopy (SEM) analyses, before being used for electrolysis, the electrode presented a flat, dense and uniform surface with some parallel scratches generated by the machining process, as shown in FIGS. 16*a* and 16*b*. However, after 406 hours of uninterrupted operation, layers of oxides/hydroxides appeared on the electrode surface (FIG. 16*c*) and small cavities generated by corrosion (FIG. 16*d*).

From the EDX spectrum (FIGS. 17 and 18- 0 h) the following chemical elements were identified on the electrode surface before the electrolysis process: Chromium (Cr), Iron (Fe), Nickel (Ni), Molybdenum (Mo), Aluminum (Al) and Silicon (Si), and when quantifying these elements from the microanalysis obtained by EDX, the percentage ratios shown in Table 4 were obtained. On the other hand, the EDX analysis of the electrode after 406 h of electrolysis showed the appearance of oxygen and sodium (Na) in the composition (Table 4 and FIG. 16). The Na probably came from the electrolyte and the presence of oxygen corroborates the formation of oxides/hydroxides generated in the electrolysis process, caused by the corrosion of the steel. Furthermore, considering only the elements nominally present in steel (Cr, Fe, Ni and Mo), it is possible to note a small increase in the ratio of Cr in relation to the other metals, indicating that Cr suffered less corrosion wear in relation to the metals Fe, Ni and Mo (Table 5).

Figure 17:
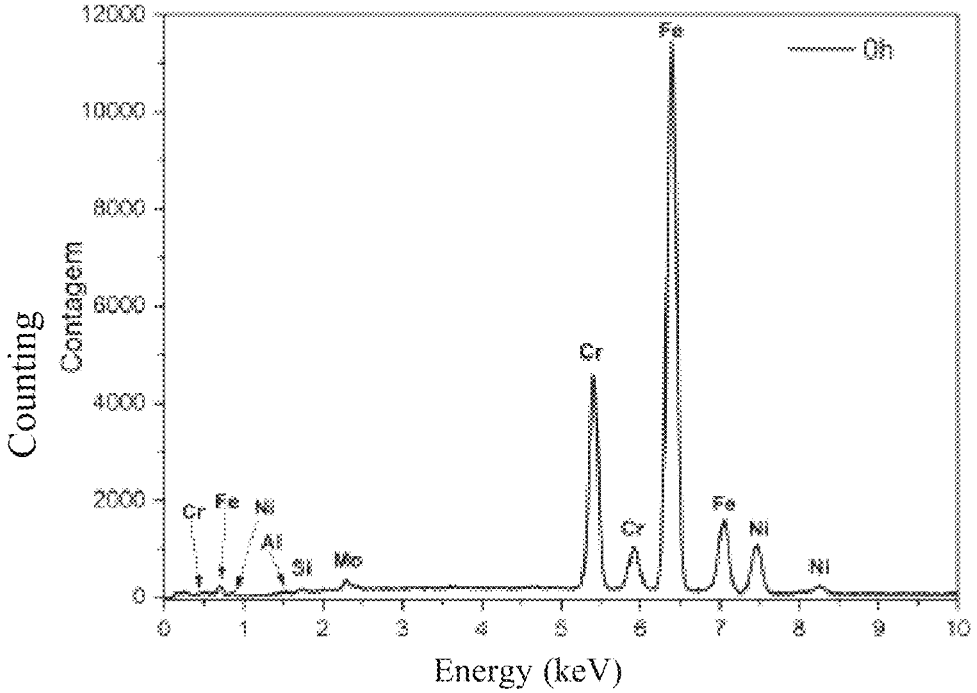
FIG. 17 and FIG. 18 show the EDX spectrum with indications of the peaks of the elements identified in the electrode before electrolysis (0 h) and after electrolysis (406*h*).
Figure 18:
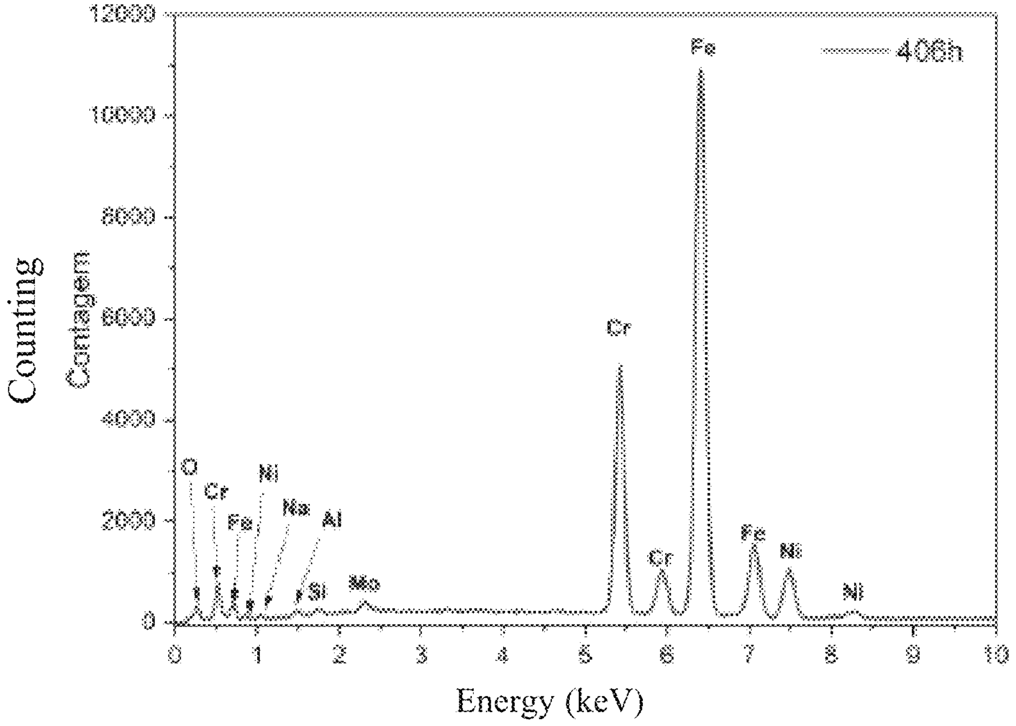
Figure 19:
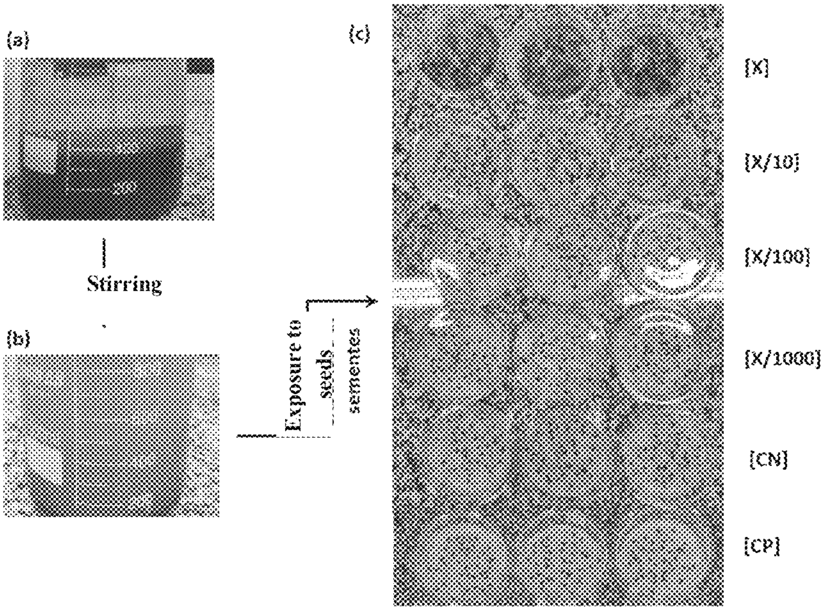
FIG. 19 shows photos of the residue: (a) before and (b) after agitation. (c) Seeds subjected to different concentrations of the residue at concentrations X, X/10, X/100 and X/1000 and to the controls CN and CP.

FIGS. 17 and 18 show the EDX spectrum with indications of the peaks of the elements identified in the electrode before electrolysis (0 h) and after electrolysis (406*h*).

Table 4, below, shows the chemical elements and their atomic proportions found on the electrode surface before and after electrolysis.

TABLE 4

| | Before electrolysis | | After 406 h of electrolysis | |
|---|---|---|---|---|
| Chemical element | % | Error % | % | Error % |
| O | Not detected | — | 27.86 | +/−1.09 |
| Na | Not detected | — | 2.73 | +/−0.24 |
| Al | 0.17 | +/−0.03 | 0.94 | +/−0.06 |
| Si | 0.31 | +/−0.03 | 0.64 | +/−0.05 |
| Cr | 18.17 | +/−0.08 | 14.99 | +/−0.09 |
| Fe | 70.92 | +/−0.29 | 46.63 | +/−0.19 |
| Ni | 9.15 | +/−0.19 | 5.59 | +/−0.13 |
| Mo | 1.29 | +/−0.12 | 0.62 | +/−0.05 |
| Total | 100.00 | | 100.00 | |

Table 5, below, presents the comparative ratio between the steel constituent elements (Fe, Cr, Ni and Mo) of the electrode before and after electrolysis.

TABLE 5

| Chemical | Before electrolysis | | After 406 h of electrolysis | |
|---|---|---|---|---|
| element | % | Error % | % | Error % |
| Cr | 18.23 | +/−0.09 | 21.84 | +/−0.13 |
| Fe | 71.27 | +/−0.29 | 68.85 | +/−0.29 |
| Ni | 9.21 | +/−0.19 | 8.38 | +/−0.19 |
| Mo | 1.30 | +/−0.12 | 0.93 | +/−0.08 |
| Total | 100.00 | | 100.00 | |

Vehicle Validation

After investigating the electrolyzer components, the electrolyzer's operation on the bench and its applications in different vehicles, the system was validated by a reputable and unblemished company in the automotive sector, Netz. Using the SAE J1321 Standard-Fuel Consumption Test Procedure-Type II, the difference in fuel consumption related to the use of the Green Fuel equipment was determined. The measurements were made by using two identical Iveco Stralis Hi Way 600S44T (6×2) tractor trucks and their respective semi-trailers weighted at their nominal PBTC condition.

One vehicle called the Test vehicle was equipped with Green Fuel technology and the second, the Control vehicle, with the original factory configuration. The main technical characteristics of the Test and Control vehicles are presented in Table 6 (FIG. 29).

The two vehicles ran simultaneously during the tests, in a back-to-back situation in compliance with the requirements of SAE J1321 Standard, so that the Control vehicle could serve as a baseline for calculating the fuel consumption of the Test vehicle with and without the Green Fuel equipment activated. All test runs were performed with the vehicles in running order, considering the following conditions: full fuel tank; water and Arla 32 tanks filled; spare tire; tools; and Driver. Each of the vehicles had a Netz Technician present during all runs, as an Observer, in order to assist the Drivers in standardizing the laps and batteries.

Aiming to obtain results closer to a road operation, the basic loading condition simulates the vehicle's nominal GCW. The ballast was operated by means of loaded 2,700 $ft^3$ containers. Beviani Transportes, the company that supplied the vehicles for testing, reported the following weights for each set: Test Set: 42,460 kg; Control Set: 43,240 kg.

The test was conducted on public highways between the cities of Balneario Piçarras, Barra Velha and Penha, all in the state of Santa Catarina. Sections of Highway BR-101 (Governador Mario Covas Hwy.) and João Batista Sêrgio Murad Hwy. were used.

The dynamic control of the runs was carried out in order to ensure repeatability and uniformity in the driving style in each cycle and in each set of batteries. The fuel was refueled at the end of each set of batteries, together with the weighing of the additional fuel tank. The operation of the vehicles was controlled by the Driver under the guidance of Netz's Technician, using the vehicle's cruise control to accelerate and maintain constant speeds on the straights of the track.

The "Constant Speed" methodology was adopted to meet the test evaluations. The runs consisted of seeking a constant speed of 70 km/h, in order to obtain an average operating speed of 58 km/h, compatible with the road operations of the company supplying the vehicles, Beviani Transportes. Each set of batteries consisted of 60.9 kilometers traveled on the round trip between the selected points.

The criterion selected for measuring fuel consumption was gravimetric analysis. Measuring fuel consumption by weighing the fuel is the most effective method due to the accuracy of the scale used and the exclusion of the temperature factor in the measurement. The weight of the fuel consumed is recorded after each battery run, for a total of three valid measurements for each Green Fuel condition: active or inactive. The vehicle was equipped with a 55-liter auxiliary portable tank. The fuel supply and return lines were removed from the vehicle's organic tank and temporarily connected to the auxiliary tank.

A small 10-liter auxiliary tank was used, similar to the fuel model, so that Arla-32 consumption measurements could be made. A NetzLog device was used to read the vehicle's CAN line and record engine operating parameters in a datalog, such as: rotation, speed, torque, acceleration and operating temperatures, at a rate of 1 second between each recording. The equipment also has a GPS location and tracking system, which is connected directly to the vehicle's OBD socket. A Racelogic V-Box, a performance navigator, was also used to measure and control acceleration and deceleration.

Throughout the test, the vehicles used S-10 Diesel fuel. Refueling took place at a commercial gas station located at km 103 of BR-101, in Balneário Piçarras, which was selected as the test base.

Every day, before the start of the tests, all tires were calibrated to 120 psi. The tires had their measurements controlled to ensure a service life of over 80%. The vehicle windows were kept closed throughout the test. Cruise control was used to maintain a constant speed of 70 km/h.

The fuel consumption comparison between the test vehicle with Green Fuel active and inactive was calculated for the tested speed of 70 km/h, by using the SAE J1321 Standard. Table 7 presents the driving information and calculation of the differences in fuel consumption, for the 70 km/h cycle, between the active and inactive Green Fuel situations. The Test vehicle with Green Fuel Activated presented a fuel consumption, by weight, 3.6% LOWER than the Test vehicle with Green Fuel Inactive.

TABLE 7

| | | | | Consumption | | | | | Differ- | Confi- | Average Consumption | | | |
|---|---|---|---|---|---|---|---|---|---|---|---|---|---|---|
| Green Fuel | Vehicle | Date | Battery | (kg) | (liters) | (l/100 km) | Range (km/l) | Consumption δ (%) * | ence Mean (%)*** | dence Interval 95%*** | (kg) | (liters) | (l/100 km) | Range (km/l) |
| Inactive | Test | 20 to 21 of Jun. 2022 | 1 | 21.180 | 24.92 | 35.60 | 2.81 | 1.14 | 3.6 | +/−2.7 | 20.970 | 24.67 | 40.51 | 2.47 |
| | | | 2 | 20.710 | 24.36 | 34.81 | 2.87 | | | | | | | |
| | | | 3 | 21.020 | 24.73 | 35.33 | 2.83 | | | | | | | |
| | Control | | 1 | 21.400 | 25.18 | 35.97 | 2.78 | 0.1 | | | 21.400 | 25.18 | 41.34 | 2.42 |
| | | | 2 | 21.390 | 25.16 | 35.95 | 2.78 | | | | | | | |
| | | | 3 | 21.430 | 25.21 | 36.02 | 2.78 | | | | | | | |
| Active | Test | JUN. 25, 2022 | 1 | 19.74 | 23.22 | 33.18 | 3.01 | 0.96 | | | 19.950 | 23.47 | 38.54 | 2.59 |
| | | | 2 | 20.01 | 23.54 | 33.63 | 2.97 | | | | | | | |
| | | | 3 | 20.11 | 23.66 | 33.80 | 2.96 | | | | | | | |
| | Control | | 1 | 20.61 | 24.25 | 34.64 | 2.89 | 2.14 | | | 21.130 | 24.86 | 40.82 | 2.45 |
| | | | 2 | 21.39 | 25.16 | 35.95 | 2.78 | | | | | | | |
| | | | 3 | 21.4 | 25.18 | 35.97 | 2.78 | | | | | | | |

Remark: * δ < 2.0%
** δ < 0.5%
***xx Average percentage difference and (xx) average difference in quantity (kg)

Regarding the consumption of Arla 32, Table 8 shows the driving information and calculation of the differences in consumption for the 70 km/h cycle, between the active and inactive Green Fuel situations. The Test vehicle with the Activated Green Fuel presented an Arla 32 consumption, by weight, 4.9% LOWER than the Test vehicle with the Inactive Green Fuel.

TABLE 8

| Green Fuel | Vehicle | Date | Battery | Consumption (kg) | Consumption δ (%) * | Average Consumption (kg) | Difference Mean (%)*** | Confidence Interval 95%*** |
|---|---|---|---|---|---|---|---|---|
| Inactive | Test | 20 to 21 | 1 | 1.180 | 6.97 | 1.25 | 4.9 | +/−4.4 |
| | | of Jun. | 2 | 1.350 | | | | |
| | | 2022 | 3 | 1.230 | | | | |
| | Control | | 1 | 1.250 | 5.33 | 1.31 | | |
| | | | 2 | 1.390 | | | | |
| | | | 3 | 1.310 | | | | |
| Active | Test | JUN. 25, | 1 | 1.42 | 20.34 | 1.18 | | |
| | | 2022 | 2 | 0.94 | | | | |
| | | | 3 | 1.18 | | | | |
| | Control | | 1 | 1.4 | 20.04 | 1.18 | | |
| | | | 2 | 0.93 | | | | |
| | | | 3 | 1.21 | | | | |

Remark: * δ < 2.0%
** δ < 0.5%
***xx Average percentage difference and (xx) average difference in quantity (kg)

It can be concluded that the comparative results for the 70 km/h cycle, suitable for highway operation, showed that the Test vehicle with the Green Fuel Electrolyzer active presents a fuel consumption, by weight, 3.6% LOWER than the inactive Green Fuel.

The consumption of Arla 32, by weight, was also 4.9% LOWER with the active Green Fuel, however, the standard deviation of each sample set was much higher than the limits allowed by the Standard. Such a result may demonstrate a trend but should not be assumed in an absolute way. It is important to emphasize that this is a secondary measurement report. The specific methodology for measuring Arla 32 consumption should be discussed in the case of greater accuracy required.

Toxicity of the Waste

As mentioned above, at the end of an operating period, the electrolyte containing suspended particulates comprises the system residue. In order to understand the effects of the residue on the environment, an analysis of environmental toxicity assessment data was performed by using the *Allium cepa* test. In general, the *Allium cepa* test is widely recognized and recommended by several national and international organizations as an effective tool for assessing the genotoxicity of chemicals and environmental pollutants. For example, bioassays using *Allium cepa* roots are validated by the International Program on Plant Bioassays (IPPB) and the United Nations Environment Program (UNEP) as an efficient test organism for "in situ" analysis and monitoring of environmental contaminants [Mutation Research, 426 (1999) 103-106].

Figure 20:
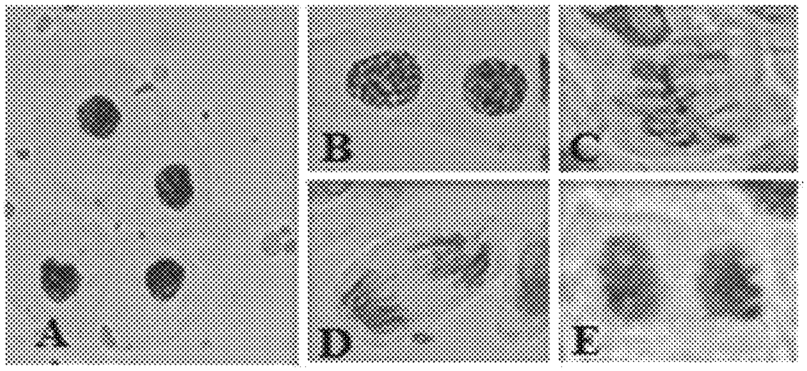
FIG. 20 shows the morphological characteristics of meristematic cells of *Allium cepa*, with normal division, (a) Interphase; (b) Prophase; (c) Metaphase; (d) Anaphase; (e) Telophase.

*Allium cepa* assays were performed using pesticide-free seeds. For each group studied, 120 seeds (3 subgroups of 40) of *Allium cepa* were placed in Petri dishes with a layer of filter paper, and were continuously exposed to the undiluted residue (hereinafter referred to as "X") and to the residue diluted in water at different concentrations (in "X/10", "X/100" and "X/1000" dilutions). Additionally, other groups of seeds were exposed to two control solutions: (i) positive control (PC), which was exposed to Trifluralin, a known mutagenic chemical agent; and (ii) negative control (NC), to distilled water, a non-toxic agent. Initially, 3 mL of the tested solutions were added to each Petri dish and, subsequently, another 1 mL was added after 48 h. Consequently, 6 groups were investigated (CN, CP, X, X/10, X/100 and X/1000), totaling 720 seeds analyzed. As represented in FIG. 20, the exposure of the seeds to the residue (and its dilutions) was performed after stirring the residue until the formation of a homogeneous phase containing the supernatant and the solid decanted.

During the bioassays, the seeds were placed in a germination and growth chamber, type B.O.D, with temperature control of 25° C., humidity of 80±5% and photoperiod of 12 h for 120 h. After this period, the Germination Index (GI) and the Mean Root Length (MRL) were determined. Subsequently, the roots of the germinated seeds were fixed (Carnoy's solution, alcohol solution and acetic acid in the ratio of 3:1 (v/v)). After 8 h of fixation, the Carnoy's solution was replaced by a new one, where the seeds remained until the slides were prepared. Subsequently, the roots underwent the washing process five times with distilled water in order to remove the Carnoy's solution. Then, by acid hydrolysis with 1 M HCl at 60° C. for 10 minutes, and then they were washed repeatedly again with distilled water. In addition, they were immersed in Schiff's reagent solution and the tubes were protected with aluminum foil to avoid contact with light.

Figure 21:
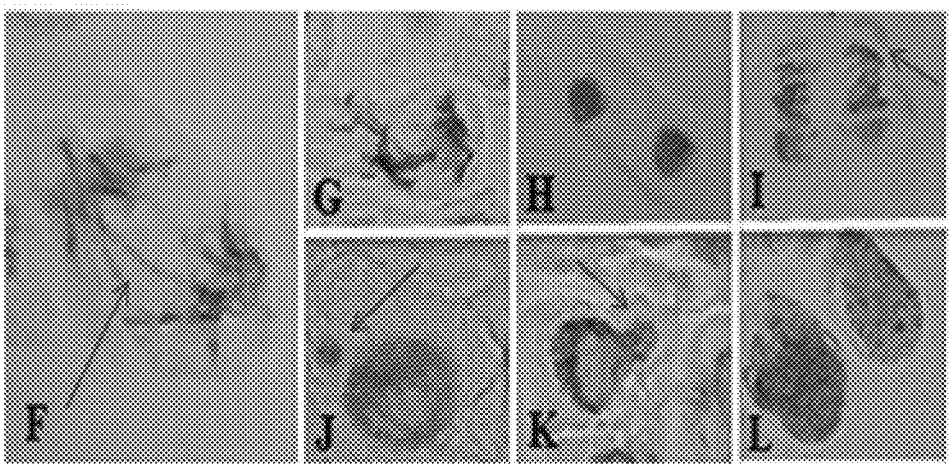
FIG. 21 shows the morphological characteristics of meristematic cells of *Allium cepa*, with abnormal division, in continuation of FIG. 21. (f) Chromosome bridge; (g) Chromosome alteration; (h) Binucleate cell; (i) Chromosome loss; (j) Micronucleus; (k) Nuclear budding; (I) Cell death.

To prepare the slides, the meristematic regions of the *Allium cepa* roots were collected and sectioned with a scalpel and placed on a glass slide, and then a drop of 45% acetic Carmine was added, covered with a coverslip and carefully crushed. For each sample, 5 slides were prepared, and then images of the cells were collected with the aid of a Nikon optical microscope, with a magnification of 40×. For each slide, 1,000 cells were observed and analyzed, totaling 5,000 cells per sample, with the aid of the ImageJ program. During this analysis process, the cells were checked and cataloged between the different cell types, divided into interphase and normally dividing cells, as shown in FIGS. 20 and 21, to determine the cell death index (CMI); mitotic index (MI), which assesses cytotoxicity; the chromosome abnormality index (CAI), which assesses genotoxic activity; and the micronucleus index (MNI), which reveals mutagenic changes.

Figure 22:
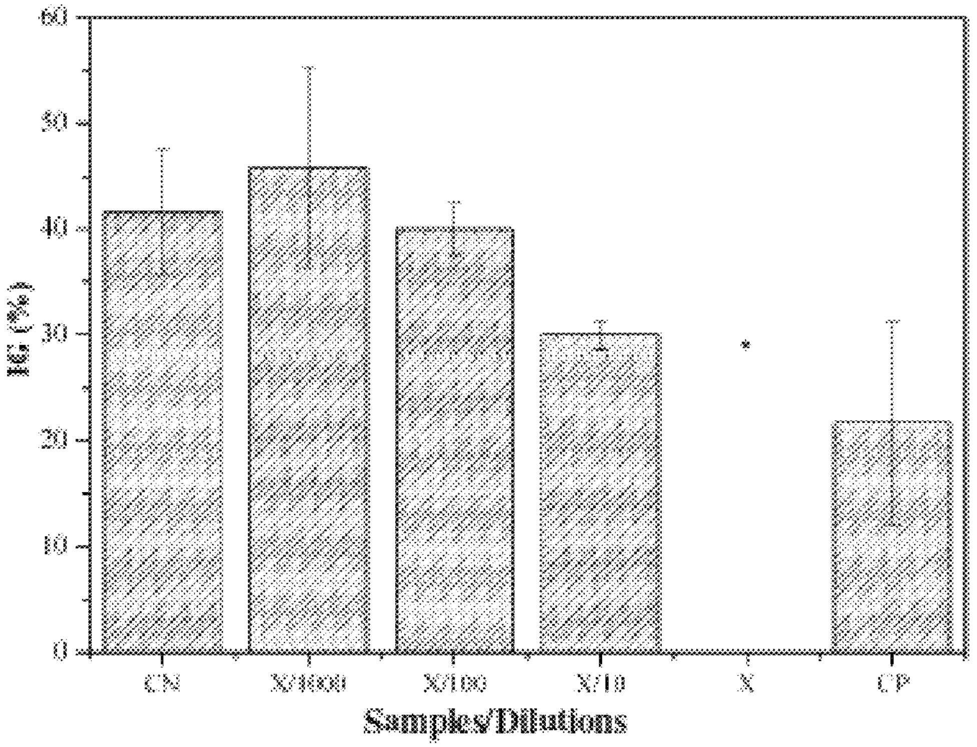
FIG. 22 shows the germination percentage of seeds treated with different dilutions of the residue.
Figure 23:
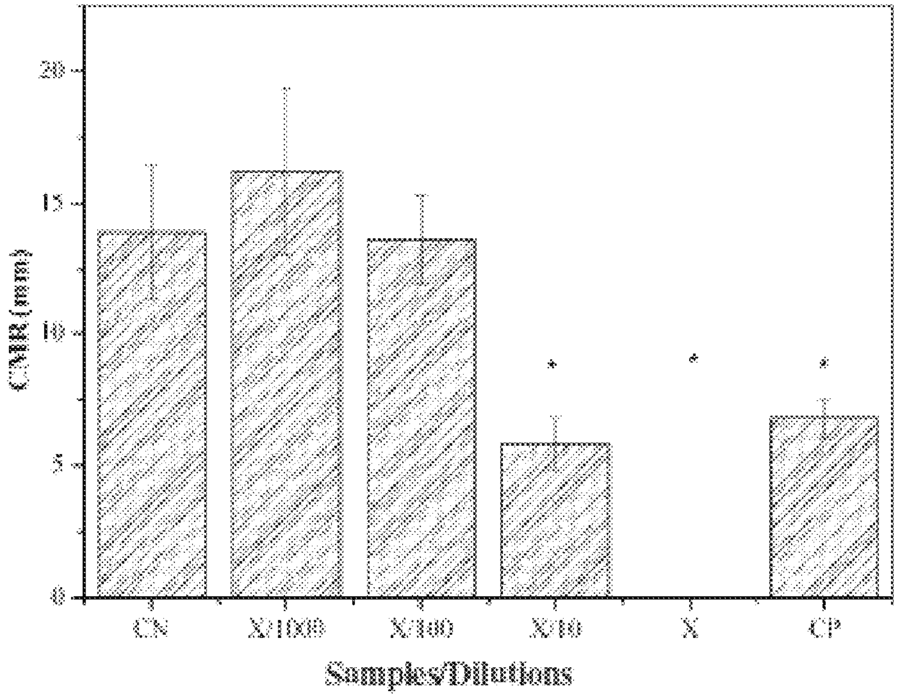
FIG. 23 shows the growth of roots treated with different dilutions of the residue.
Figure 24:
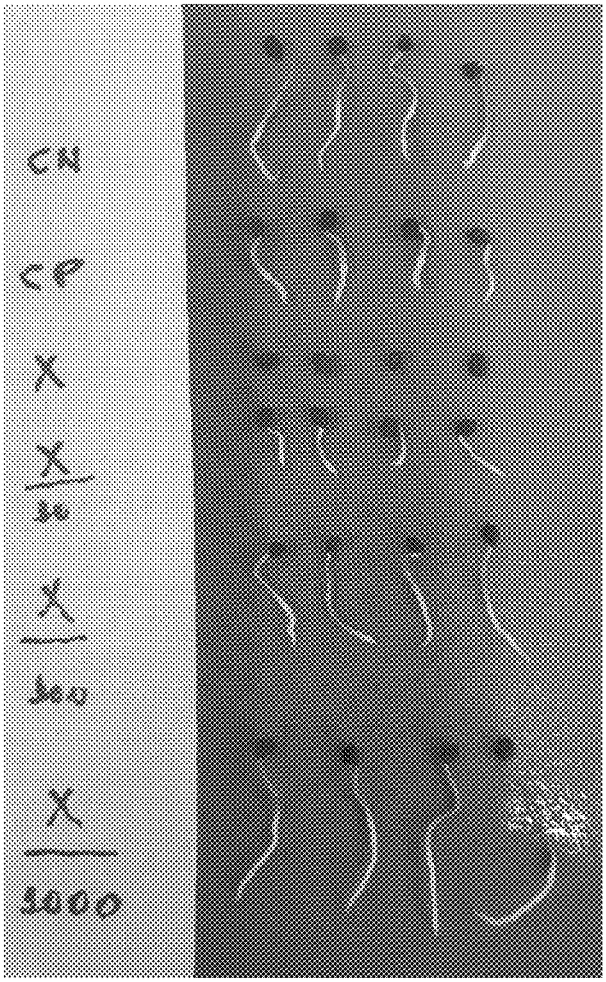
FIG. 24 shows an illustrative and comparative image of seeds/roots subjected to different treatments.

FIGS. 22 and 23 show the GI and CMR results, respectively, for roots treated with different dilutions of the residue. The results indicate a total inhibition of seed germination when subjected to the undiluted residue (sample "X", in FIG. 22). The X/10 dilution showed a tendency to decrease the germination index (FIG. 22) and negatively impacted root growth, promoting a reduction of approximately two-thirds, similarly to that caused by Trifuralin (CP, positive control) as shown in FIG. 23. In contrast, the more diluted samples (X/100 and X/1000) induced a behavior similar to that produced by water (CN) and, consequently, did not present phytotoxicity. Furthermore, the results also indicate that the residue in its most diluted formulation (X/1000) demonstrated a slight tendency to promote greater root growth, as shown in FIG. 23 and illustrated in FIG. 24.

Figure 25:
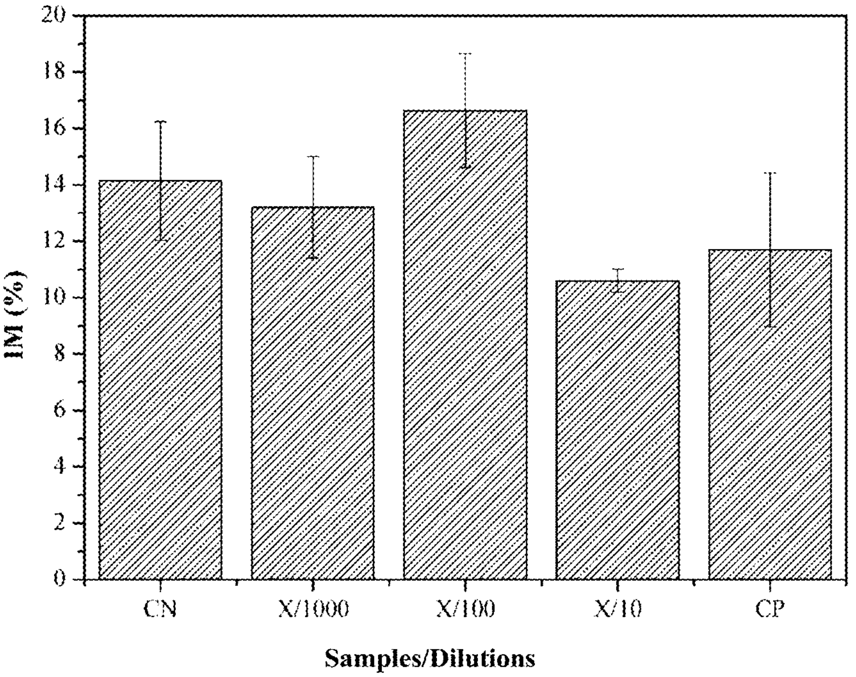
FIG. 25 shows the mitotic indices (cytotoxicity) for treatments of roots treated with different dilutions of the residue.
Figure 26:
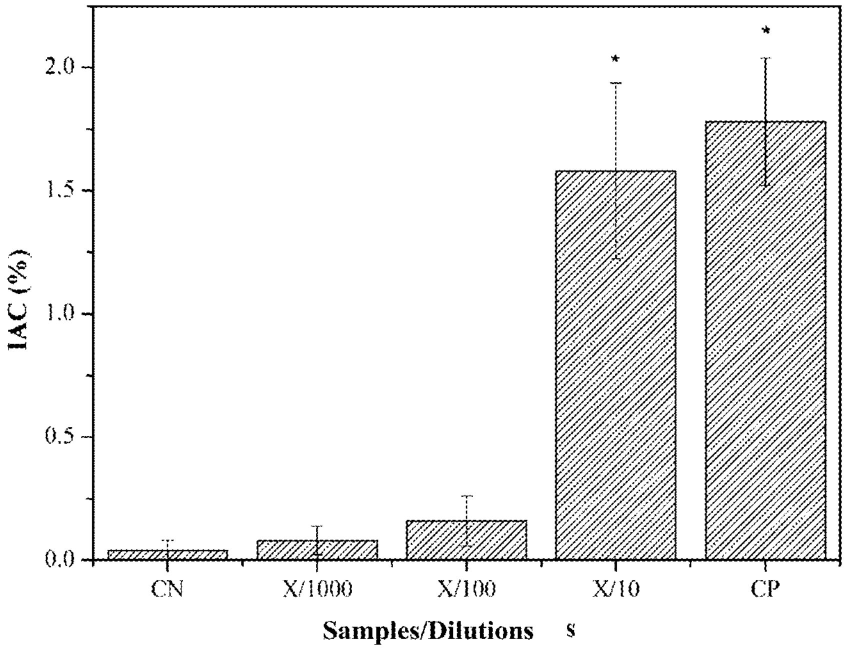
FIG. 26 shows the chromosomal abnormality (genotoxicity) rates for root treatments treated with different dilutions of the residue.
Figure 27:
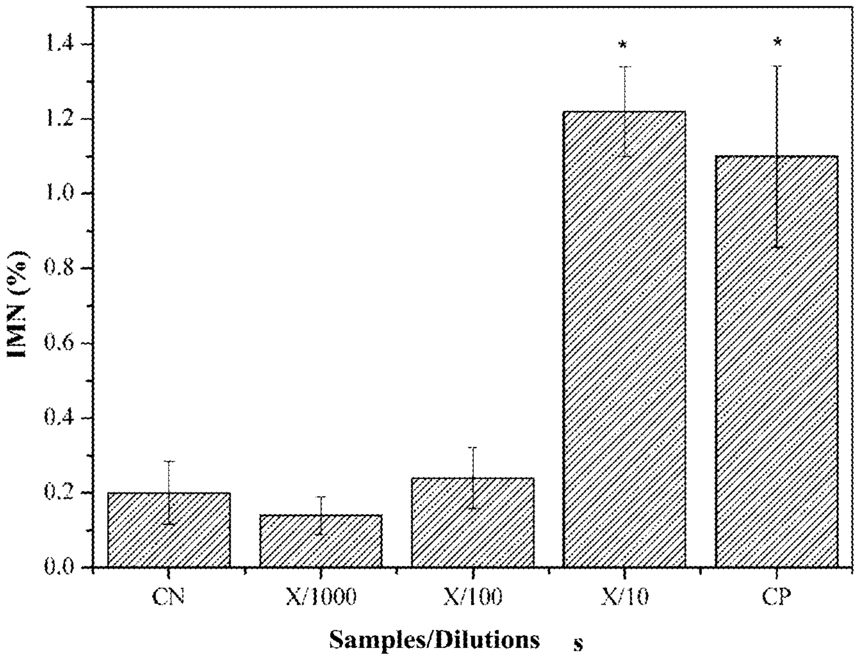
FIG. 27 shows the micronucleus (mutagenicity) rates for roots treated with different dilutions of the residue.

Regarding cellular analyses, the results showed that none of the treatments altered the MI (FIG. 25). However, as in the case of the analyses of germination and root growth rates, only the most diluted residue solutions (X/100 and X/1000) were not genotoxic and mutagenic, inducing effects similar to water (CN), as shown in FIGS. 26 and 27, respectively.

Figure 28:
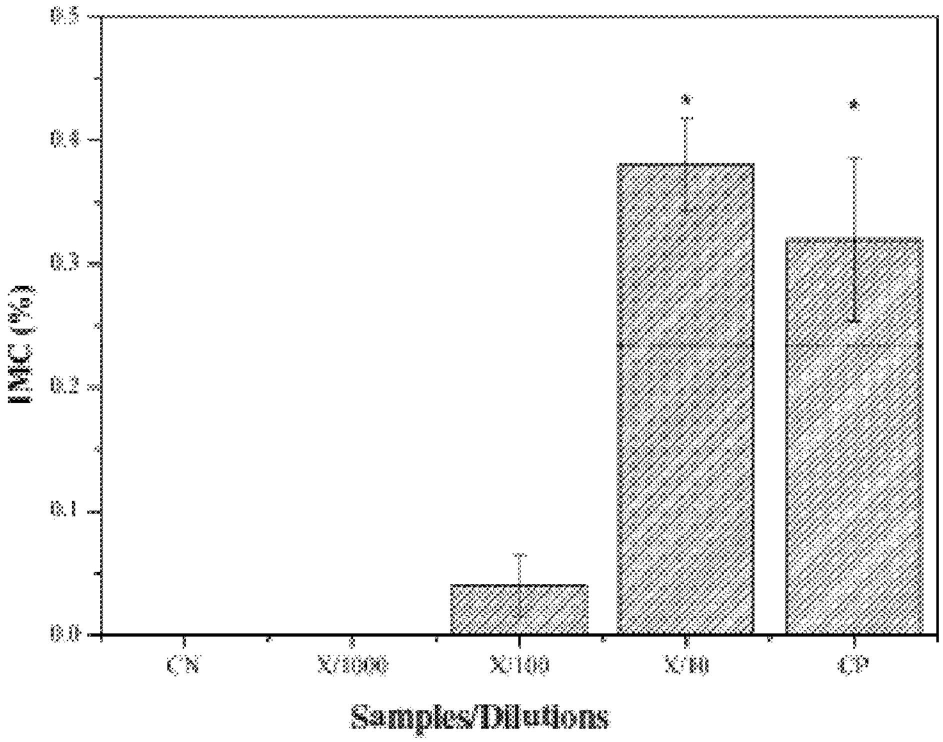
FIG. 28 shows the cell death rate for roots treated with different dilutions of the residue.

Finally, the findings also showed that only the water (CN) and residue samples diluted a thousand times (X/1000) did not present cell death, as shown in FIG. 28.

Based on the results presented and the analyses of the germination, root growth, mitosis, micronucleus, chromosomal abnormalities and cell death rates, it is concluded that the sample has a harmful potential in case of direct disposal into the environment, as demonstrated by the inhibition of germination and observations of genotoxic and mutagenic alterations. However, the results also demonstrate that when an adequate dilution is performed, it is possible to obtain a diluted solution of the residue that does not present environmental toxicity through the *Allium cepa* test. This was obtained when the residue was agitated and subsequently diluted in water in a 1:1000 ratio of residue to water. In this context, disposal in the sewage system seems appropriate due to the dilution of the system itself.

CONCLUSIONS

Gas generation performance measurements of real cells and those in continuous operation were analyzed, as well as exploratory measurements of the morphology and elemental chemical composition of the electrodes. In general, the electrolyzers presented stable performance aiming at the production of $H_2$ and $O_2$ for administration in Diesel cycle engines.

After analyzing three electrolyzers in operation for 406 hours, we identified constant production of gases with a majority composition of $H_2$; with an average composition in molar percentage of 60:40 of $H_2$:$O_2$. This result shows that both electrodes of the cell function well both as anode and cathode during the periodic alternation of polarization of the system.

Microscopic investigation of the electrode shows a thick film composed of agglomerates on its surface after 406 hours of operation. The energy-dispersive X-ray spectra obtained from scanning electron microscopy show intense corrosion, with an increase in oxygen and a significant decrease in the amounts of iron, chromium and nickel in the surface chemical composition of the electrode. However, this corrosion did not affect the production and composition of the gases.

The 70 km/h vehicle validation test, suitable for road operation, showed that the Test vehicle with the Green Fuel Electrolyzer active presented a fuel consumption, by weight, 3.6% LOWER than that with the Green Fuel inactive. Additionally, the consumption of Arla 32, by weight, was also 4.9% LOWER with the Green Fuel active, however, the standard deviation of each sample set was much higher than the limits permitted by the Standard. This result may demonstrate a trend but should not be assumed in absolute terms with regard to Arla.

Phytotoxicity tests performed on electrolyzer residues after a cycle of use showed that the residue needs to be diluted in water to avoid toxicity. It is suggested, therefore, that the material be discarded in water or even in the sewage system, to induce the residue to dilute.

The invention claimed is:

1. A hydrogen-generating device, combustion optimizer and pollutant emission reducer in diesel cycle engines, wherein said device producing a quantity of hydrogen to be injected into the engine and comprising an electrolyzer comprising an aqueous electrolytic solution and two electrodes with periodic alternation of polarity of the electrodes, and having heat exchangers in its external part; and electronic module for direct control of electrical voltage, with potentiostatic operation and/or with galvanostatic or indirect operation, and alternation of the polarity of the electrodes that depend on the rotation of the engine and the topography of the location, with said device injecting a quantity of up to 9% 10% of a hydrogen:oxygen mixture, in a ratio of 65%: 35%, respectively of hydrogen:oxygen, per liter of diesel consumed in a volume/volume ratio, presenting an alternation of polarity between the electrodes from one to three times per minute, wherein the electrodes comprise parallel rods.

2. A method of using a hydrogen-generating device, combustion optimizer and pollutant emission reducer in diesel cycle engines, according to claim 1, wherein injecting a quantity of up to 8% of a hydrogen:oxygen mixture, in the ratio of 65%: 35%, per liter of diesel consumed in a volume/volume ratio.

3. A method of using a hydrogen-generating device, combustion optimizer and pollutant emission reducer in diesel cycle engines, according to claim 1, wherein injecting into the engine an amount of up to 8% of the hydrogen: oxygen mixture from an electrolyzer, in the ratio of 50%: 50% to 70%: 30%, respectively hydrogen:oxygen, per liter of diesel consumed in a volume/volume ratio, said container presenting periodic alternation of polarity between the electrodes with a frequency that can vary from one to three times per minute, said device presents optimized heat exchange due to the presence of external fins, producing a flow of oxygen/hydrogen mixture of 10 to 50 mL/min, with the production of gases controlled by an electronic module sensitive to the topography of the location traveled and the engine speed.

4. A method of using a hydrogen-generating device, combustion optimizer and pollutant emission reducer in diesel cycle engines, according to claim 1, wherein producing a flow of oxygen/hydrogen mixture operating in a volume ratio of 65%: 35% ($H_2$:$O_2$) of 10 to 30 mL/min.

5. A method of using a hydrogen-generating device, combustion optimizer and pollutant emission reducer in diesel cycle engines, according to claim 1, wherein injecting an amount of up to 6% hydrogen.

6. The hydrogen-generating device, combustion optimizer and pollutant emission reducer in diesel cycle engines, according to claim 1, wherein an aqueous electrolytic solution comprising 0.01 to 0.50 mol $L^{-1}$ of NaHCO3, 0.01 to 0.50 mol L−1 of KOH, and also 0.001 to 0.100 mol $L^{-1}$ of an additive of C16H10N2Na2O7S2, or any other with the same function.

7. The hydrogen-generating device, combustion optimizer and pollutant emission reducer in diesel cycle engines, according to claim 1, wherein the electrodes being made of stainless steel or derived from different stainless steel alloys.

8. The hydrogen-generating device, combustion optimizer and pollutant emission reducer in diesel cycle engines, according to claim 1, wherein the electrolyzer being made of cast aluminum alloy and having heat exchanger fins on the outside.

9. A method of using a hydrogen-generating device, combustion optimizer and pollutant emission reducer in diesel cycle engines, according to claim 1, wherein said device being applicable in diesel cycle engines with consumption of up to 20 liters of diesel per hour.

10. A method of using a hydrogen-generating device, combustion optimizer and pollutant emission reducer in diesel cycle engines, according to claim 1, wherein said device consuming energy less than 3.0 Watts/liter of diesel to generate the hydrogen/oxygen mixture, according to the engine's operating conditions.

11. A method of using a hydrogen-generating device, combustion optimizer and pollutant emission reducer in diesel cycle engines, according to claim 1, wherein one same engine being able to employ one or more devices according to the invention.

* * * * *